(12) United States Patent
Wang et al.

(10) Patent No.: US 11,556,366 B2
(45) Date of Patent: Jan. 17, 2023

(54) CONTAINER LOGIN METHOD, APPARATUS, AND STORAGE MEDIUM

(71) Applicant: TENCENT TECHNOLOGY (SHENZHEN) COMPANY LIMITED, Guangdong (CN)

(72) Inventors: Sheng Qian Wang, Shenzhen (CN); Lei Peng, Shenzhen (CN); Zhong Hua Zhu, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 43 days.

(21) Appl. No.: 16/587,117

(22) Filed: Sep. 30, 2019

(65) Prior Publication Data

US 2020/0026545 A1 Jan. 23, 2020

Related U.S. Application Data

(63) Continuation of application No. PCT/CN2018/102191, filed on Aug. 24, 2018.

(30) Foreign Application Priority Data

Sep. 20, 2017 (CN) .......................... 201710853818.1

(51) Int. Cl.
*H04L 29/08* (2006.01)
*H04L 29/06* (2006.01)
(Continued)

(52) U.S. Cl.
CPC .......... *G06F 9/45558* (2013.01); *H04L 67/02* (2013.01); *H04L 67/06* (2013.01); *H04L 69/04* (2013.01); *G06F 2009/45595* (2013.01)

(58) Field of Classification Search
CPC ....... G06F 9/45558; G06F 2009/45595; G06F 2009/45587; H04L 67/02; H04L 67/06;
(Continued)

(56) References Cited

U.S. PATENT DOCUMENTS 6,106,570 A * 8/2000 Mizuhara ................ H04L 67/14
717/169
7,181,523 B2 * 2/2007 Sim ........................ H04L 67/101
709/224
(Continued)

FOREIGN PATENT DOCUMENTS

CN 105872019 A 8/2016
CN 106484886 * 10/2016
(Continued)

OTHER PUBLICATIONS

Written Opinion of the International Searching Authority dated Nov. 14, 2018 in International Application No. PCT/CN2018/102191.
(Continued)

*Primary Examiner* — Kevin T Bates
*Assistant Examiner* — Golam Mahmud
(74) *Attorney, Agent, or Firm* — Sughrue Mion, PLLC

(57) ABSTRACT

A container login method, a container login apparatus, and a storage medium are provided. In an example embodiment, a target container login request from a browser is received; a first connection between a server and the browser is established based on the target container login request; an address of a control node corresponding to a container cluster in which a target container is located is obtained based on an identifier of the container cluster; and a second connection between the server and the target container is established based on the address of the control node and an identifier of the target container, to log in to the target container.

12 Claims, 16 Drawing Sheets

(51) Int. Cl.
  *H04L 67/02* (2022.01)
  *H04L 67/06* (2022.01)
  *G06F 9/455* (2018.01)
  *H04L 69/04* (2022.01)

(58) Field of Classification Search
  CPC ....... H04L 69/04; H04L 63/08; H04L 63/168; H04L 29/06; H04L 63/0815; H04L 67/14; H04L 69/08
  USPC ......................................................... 709/223
  See application file for complete search history.

(56) References Cited

U.S. PATENT DOCUMENTS

| | | | | |
|---|---|---|---|---|
| 7,359,897 | B2* | 4/2008 | Singh | G06F 16/168 |
| | | | | 707/999.002 |
| 8,352,430 | B1* | 1/2013 | Myhill | G06F 11/1464 |
| | | | | 707/640 |
| 9,432,433 | B2* | 8/2016 | Luby | H04N 65/752 |
| 9,560,165 | B2* | 1/2017 | Liu | H04L 67/06 |
| 9,609,063 | B2* | 3/2017 | Zhu | G06F 9/544 |
| 9,614,893 | B2* | 4/2017 | Kim | H04L 67/06 |
| 9,635,143 | B2* | 4/2017 | Jensen | H04L 67/1095 |
| 10,303,892 | B1* | 5/2019 | Lim | G06F 16/986 |
| 10,681,127 | B2* | 6/2020 | Liu | H04L 43/10 |
| 2004/0205199 | A1* | 10/2004 | Gormish | H04L 9/40 |
| | | | | 709/229 |
| 2006/0259589 | A1* | 11/2006 | Lerman | G06F 16/40 |
| | | | | 709/219 |
| 2007/0174774 | A1* | 7/2007 | Lerman | G06F 16/40 |
| | | | | 715/723 |
| 2007/0183741 | A1* | 8/2007 | Lerman | H04L 67/02 |
| | | | | 386/280 |
| 2008/0163202 | A1* | 7/2008 | Kembel | H04L 67/306 |
| | | | | 707/E17.119 |
| 2012/0233668 | A1* | 9/2012 | Leafe | G06F 9/44526 |
| | | | | 726/4 |
| 2013/0067027 | A1* | 3/2013 | Song | H04N 1/00228 |
| | | | | 709/217 |
| 2014/0068254 | A1* | 3/2014 | Scharf | H04L 9/0894 |
| | | | | 713/165 |
| 2014/0181969 | A1* | 6/2014 | Mousty | G06F 16/182 |
| | | | | 707/827 |
| 2014/0201316 | A1* | 7/2014 | Chinn | H04L 67/145 |
| | | | | 707/661 |
| 2014/0240753 | A1* | 8/2014 | Anno | G06F 3/1236 |
| | | | | 358/1.15 |
| 2015/0113040 | A1* | 4/2015 | Marquess | H04L 67/02 |
| | | | | 709/202 |
| 2015/0180963 | A1* | 6/2015 | Luecke | H04L 67/10 |
| | | | | 709/203 |
| 2015/0186214 | A1* | 7/2015 | Gladwin | G06F 11/0793 |
| | | | | 714/766 |
| 2015/0334110 | A1* | 11/2015 | Bishop | H04L 9/3215 |
| | | | | 713/156 |
| 2016/0028688 | A1* | 1/2016 | Chizhov | H04L 69/08 |
| | | | | 726/12 |
| 2016/0234303 | A1* | 8/2016 | Liu | H04L 67/1085 |
| 2016/0359955 | A1* | 12/2016 | Gill | H04L 67/1097 |
| 2016/0366104 | A1 | 12/2016 | Goldberg et al. | |
| 2017/0237708 | A1* | 8/2017 | Klaghofer | H04L 67/02 |
| | | | | 726/12 |
| 2018/0103050 | A1* | 4/2018 | Mason | H04L 63/168 |
| 2018/0225095 | A1* | 8/2018 | Kamalakantha | G06F 8/60 |
| 2019/0155613 | A1* | 5/2019 | Olderdissen | G06F 8/63 |

FOREIGN PATENT DOCUMENTS

| | | | | |
|---|---|---|---|---|
| CN | 106209827 | A | 12/2016 | |
| CN | 106302448 | A | 1/2017 | |
| CN | 106411919 | A | 2/2017 | |
| CN | 106685949 | A | 5/2017 | |
| CN | 106899544 | A | 6/2017 | |
| CN | 106982249 | A * | 7/2017 | ............ H04L 67/06 |
| WO | 2015/187716 | A1 | 12/2015 | |

OTHER PUBLICATIONS

Office Action dated Nov. 12, 2020 in Chinese Application No. 201710853818.1.

"LAIN Platform Remote Entry Container Function Design and Implementation", Baihua, http:www.souhu.com/a/130846113_198222, Mar. 29, 2017 (7 pages total).

International Search Report for PCT/CN2018/102191 dated Nov. 14, 2018 [PCT/ISA/210].

* cited by examiner

| Container name | IP of a node in which a container is located | Container name | Container ID | Operation |
|---|---|---|---|---|
| ☐ Centos-123456 | 192.168.10.14 | Centos | 7774567777 | Remote login |

FIG. 2b

CONTAINER LOGIN METHOD, APPARATUS, AND STORAGE MEDIUM

CROSS-REFERENCE TO RELATED APPLICATION(S)

This application is a continuation application of International Application No. PCT/CN2018/102191, filed on Aug. 24, 2018, which claims priority to China Patent Application No. 201710853818.1, filed with National intellectual Property Administration, PRC on Sep. 20, 2017 and entitled "CONTAINER LOGIN METHOD AND APPARATUS, AND STORAGE MEDIUM", the disclosures of which are herein incorporated by reference in their entireties.

BACKGROUND

1. Field

The disclosure relates to the field of communications technology, and specifically, to a container login method, a container login apparatus and a storage medium.

2. Description of the Related Art

In software development process, an application (APP) and a dependent package may be packed into a transportable container. The container may help a developer better know how an application is run. The developer may place many containers in a single-host operating system. A unique operating system of a server is a host operating system, and the container is directly carried on the host operating system, to directly communicate with the host operating system, thereby ensuring a small size of the container and reducing additional costs. Accordingly, the container is increasingly widely applied.

To manage the container, a container management system has been developed, such as Kubernetes. Kubernetes is a container cluster management system of a Google open source. Kubernetes is constructed on a Docker technology and may provide various functions to a container cluster, such as resource scheduling, application deployment, running monitoring, service discovery, error processing, capacity expansion, and capacity reduction to conveniently manage the container by using Kubernetes. Docker is an application container technology of an open source based on a light-weight virtualization technology.

SUMMARY

One or more example embodiments provide a container login method, a container login apparatus, and a storage medium therefor, in which an operation for logging in to the container is simplified and has improved efficiency, thereby improving user experience.

According to an aspect of an example embodiment, a method for logging in to a container, applied to a server is provided. A target container login request from a browser is received. A first connection between a server and the browser is established based on the target container login request. An address of a control node corresponding to a container cluster in which a target container is located is obtained based on an identifier of the container cluster. A second connection between the server and the target container is established based on the address of the control node and an identifier of the target container, to log in to the target container.

According to an aspect of an example embodiment, provided is a container login apparatus, applied to a server, including at least one memory operable to store program code; and at least one processor operable to read the program code and operate as instructed by the program code, the program code including: receiving code configured to cause at least one of the at least one processor to receive a target container login request from a browser, the target container login request including an identifier of a target container and an identifier of a container cluster in which the target container is located; first establishment code configured to cause at least one of the at least one processor to establish a first connection between the server and the browser based on the target container login request; obtaining code configured to cause at least one of the at least one processor to obtain, based on the identifier of the container cluster, an address of a control node corresponding to the identifier of the container cluster; and second establishment code configured to cause at least one of the at least one processor to establish a second connection between the server and the target container based on the address of the control node and the identifier of the target container, to log in to the target container.

According to an aspect of an example embodiment, provided is a non-transitory computer readable storage medium, storing instructions that are executable by at least one processor to perform a method for logging in to a container, the method including: receiving a target container login request from a browser, the target container login request including an identifier of a target container and an identifier of a container cluster in which the target container is located; establishing a first connection between a server and the browser based on the target container login request; obtaining, based on the identifier of the container cluster, an address of a control node corresponding to the container cluster; and establishing a second connection between the server and the target container based on the address of the control node and the identifier of the target container, to log in to the target container.

BRIEF DESCRIPTION OF THE DRAWINGS

These and/or other aspects will become apparent and more readily appreciated from the following description of the embodiments, taken in conjunction with the accompanying drawing. Apparently, the accompanying drawings in the following description show only some embodiments of the disclosure, and a person of ordinary skill in the art may still derive other drawings from these accompanying drawings without creative efforts.

FIG. 2b is an example diagram of an interface in a container login method according to an example embodiment.

DETAILED DESCRIPTION

Figure 1:
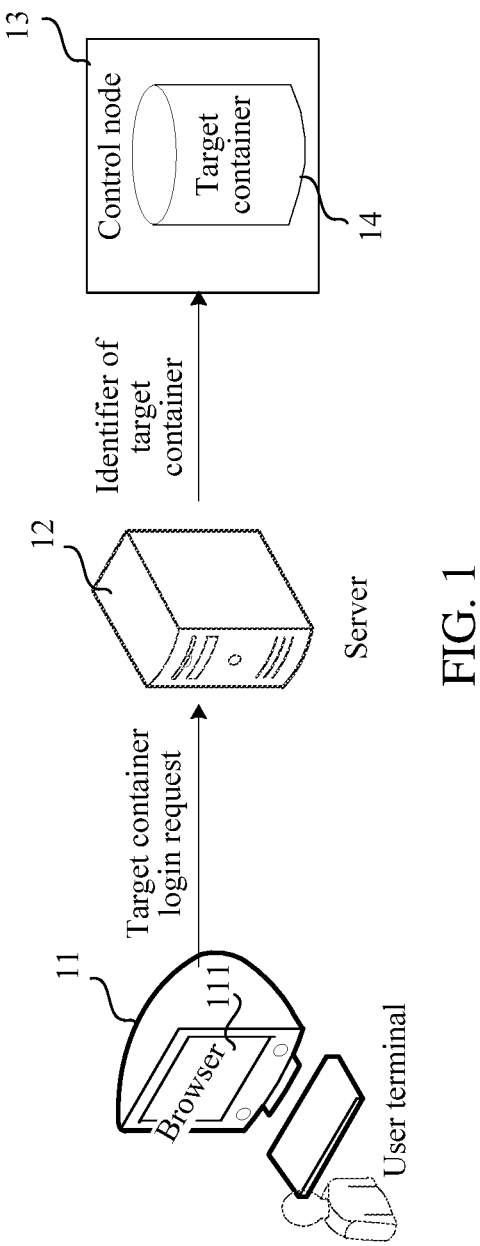
FIG. 1 is a schematic diagram of a scenario of a container login method according to an example embodiment.

To make the objectives, the technical solutions, and the advantages of the disclosure clearer, the following further describes the disclosure in detail with reference to the accompanying drawings and example embodiments. It should be understood that the specific embodiments described herein are only used to describe the disclosure, instead of limiting the disclosure.

Referring to the drawings, same components are represented by same component symbols. The principle of the disclosure is illustrated by an application in a suitable computing environment. The following description is based on the illustrated specific embodiment of the disclosure, which should not be construed as limiting other specific embodiments of the disclosure not discussed in detail herein.

In the following description, example embodiments of the disclosure are described with reference to the drawings, in which operations performed by one or more computers or processors are described, unless otherwise stated. For example, it may be understood that the operations are performed by a computer including a computer processing unit configured to manipulate electronic signals that are representative of a structured type of data. This manipulation converts the data or maintains the location of the data in a memory system of the computer, which can be reconfigured, or otherwise a person skilled in the art may change the way of operation of the computer in a well-known manner. The data structure maintained in the physical location of the data in the memory has specific properties defined by the data format. However, the principle of the disclosure described in the foregoing does not lead to a limitation. A person skilled in the art may understand that various steps and operations described below may also be implemented in hardware.

The terms "a module" and/or "a unit" used in the disclosure are for referring to elements performing at least one function or operation, and these elements may be implemented as hardware or software, or as a combination of hardware and software. Further, a plurality of "modules" or "units" may be integrated into at least one module and implemented as at least one processor, except "modules" or "unit" that need to be implemented as specific hardware.

For example, the term "module" may be used to refer to a software object executed on an operating system. Different components, modules, engines, and services in the disclosure may be regarded as objects implemented on the operating system. The apparatus and the method in the disclosure may be implemented in a software manner (e.g., using one or more modules implemented as a software object) or may be implemented on hardware or a combination of hardware and software. A person of ordinary skill in the art should understand that various implementations based on software, hardware, or a combination of hardware and software of an embodiment fall within the protection scope of the disclosure.

Example embodiments of the disclosure provide a method of logging in to a container (or a container login method), an apparatus for logging in to a container (or a container login apparatus), and a storage medium.

The container login apparatus may be provided or specifically integrated in a device such as a server. An example in which the container login apparatus is specifically integrated in the server is described.

FIG. 1 is a diagram illustrating a configuration of a system to which a container login method according to some embodiments is applied. As shown in FIG. 1, the system to which the container login method according to some embodiments is applied includes at least: a user terminal 11, a server 12, and a control node 13. The control node 13 includes a target container 14.

The user terminal 11 may be an intelligent device having a data computing and processing function and includes, but is not limited to, a smartphone, a palm computer, a tablet computer, and a personal computer. The user terminal 11 may include a communications module installed thereon. An operating systems is installed on the user terminal 11 and includes, but is not limited to: an Android operating system, a Symbian operating system, a Windows mobile operating system, and an iPhone OS operating system. Various application clients, such as a browser 111, are installed on the user terminal 11.

A container login apparatus according to an example embodiment is installed on the server 12. The container long apparatus performs the container login method according to an example embodiment. Further, the server 12 may also have a function of reverse proxy.

The control node 13 is also referred to as a node, and a container cluster in which the target container 14 is located is run on the node. The container cluster further includes other one or more containers in addition to the target container 14.

As shown in FIG. 1, the server 12 may receive a target container login request that is transmitted from the user terminal 11 through the browser 111, establish a first connection between the server 12 and the browser 111 in response to the target container login request, then obtain, according to an identifier of a container cluster in the login request, an address of a control node corresponding to the identifier of the container cluster in which the target container 14 is located, and establish a second connection between the server 12 and the target container 14 according to the address of the control node and an identifier of the target container, to log in to the target container. After logging in to the target container, the user may execute any command, such as an upload command, a download command, a compression command, or a decompression command, in the target container.

The target container 14 may be an application container engine of an open source, so that developers can packet applications and dependent packages of the developers into the target container 14, such as a docker container.

Herein, in a docker technology, an application may be fast and automatically deployed inside a container, and resource isolation, security guarantee, and the like of the container may be provided through a kernel virtualization technology. The docker container binds key application program components in a single container, so that the docker container implements portability between different platforms and cloud computing.

The container cluster management system may be Kubernetes. Kubernetes is an open source platform that performs automatic deployment, expansion, and container operations between cluster hosts and uses a container as a central infrastructure. Kubernetes may be used to address demands for quickly deploying an application, expanding an application at a very high speed, seamlessly spreading a new application function, reducing resources, optimizing use of hardware resources, and the like. The demands that may be addressed by Kubernetes are not limited to the above examples.

An example embodiment is described below from the perspective of the container login apparatus. The container login apparatus may be provided to or specifically integrated in a device such as a server.

A container login method, applied to a server, includes: receiving a target container login request transmitted by a browser, the target container login request including an identifier of a target container and an identifier of a container cluster in which the target container is located; establishing a first connection between the server and the browser in response to the target container login request; obtaining, according to the identifier of the container cluster, an address of a control node corresponding to the container cluster in which the target container is located; and establishing a second connection between the server and the target container according to the address of the control node and the identifier of the target container, to log in to the target container.

Figure 2A:
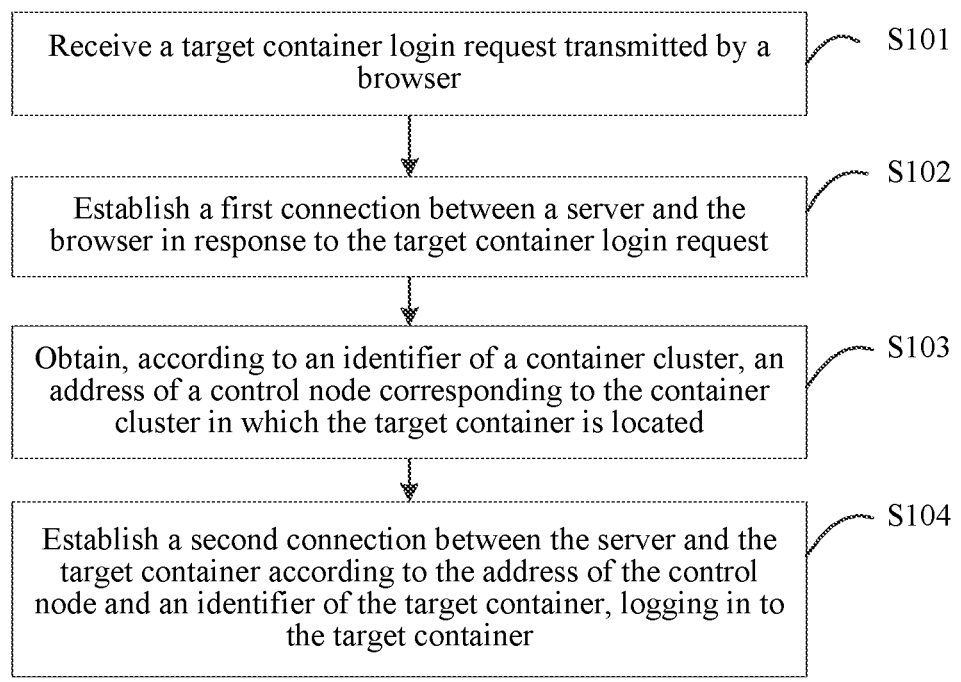
FIG. 2a is a flowchart of a container login method according to an example embodiment.

As shown in FIG. 2*a*, the container login method according to an example embodiment may include operations S101 to S104:

Operation S101: Receive a target container login request transmitted by a browser, the target container login request including an identifier of a target container and an identifier of a container cluster in which the target container is located.

In some embodiments, the identifier (ID, identification) of the target container refers to a code for indicating an identity of a container, for example, a character string including numbers and letters. In the container cluster, a unique container ID may be set for each container in advance.

In some embodiments, in order for the user to log in to the target container, the user may transmit the target container login request through the browser. For example, an interface of the browser may be provided to the user, and the target container login request that is transmitted by the user through the browser is received. The target container login request is used for requesting to log in to the target container.

The target container is a container that the user wishes to log in to. The target container may be any container. For example, in some implementations, the target container may be a docker container. The container may provide isolated running space to an application program. Each container contains exclusive complete user environment space, and change of a container does not affect running environments of other containers.

In the related technology, a plurality of commands need to be input in a command line interface in a process of logging in to the container. The command line interface may be a shell interface. The shell interface is a user interface for providing an interaction operation between the user and a kernel. The shell interface may receive the commands input by the user and transmit the commands to the container for execution. However, a plurality of particular commands, for example, a command for searching for a node, a command for logging in to a node, a command for searching for a container, and a command for logging in to a container, need to be input when the container is logged in to through the command line interface. Therefore, a container login manner in the related technology has complex operations, low efficiency, and poor user experience.

In an example embodiment, a browser interface may be provided to the user. For example, as shown in FIG. 2*b*, the user may directly log in to the container through the browser interface and does not need to input a plurality of commands in the command line interface. Therefore, in an example embodiment, the browser interface is provided, to simplify an operation for logging in to the container and improve efficiency, thereby improving user experience.

Operation S102: Establish a first connection between a server and the browser in response to the target container login request.

For example, the first connection between the server and the browser is established in response to the target container login request transmitted from the user terminal.

The first connection is used for implementing communication between the server and the browser. A method for establishing the first connection between the server and the browser may be determined according to actual requirements.

Figure 2C:
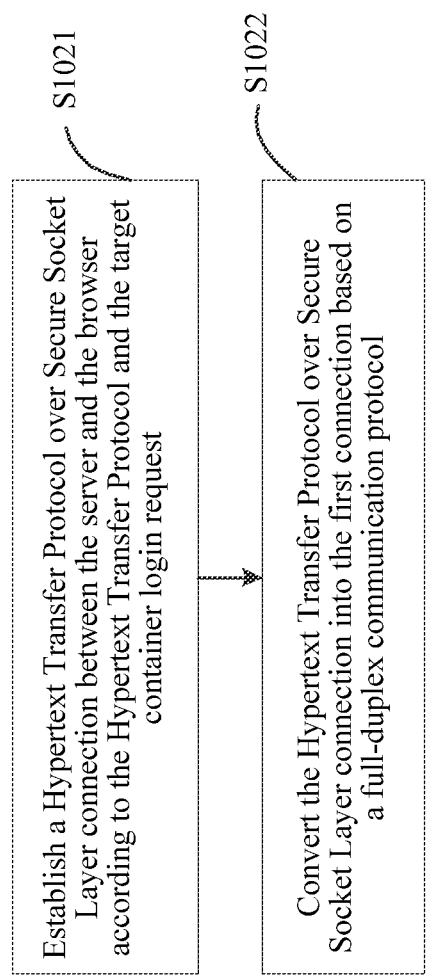
FIG. 2c is a flowchart of a method for establishing a first connection between a server and a browser according to an example embodiment.

FIG. 2*c* is a flowchart of a method for establishing a first connection between a server and a browser according to an example embodiment. For example, in some implementations, as shown in FIG. 2*c*, the operation of "establishing a first connection between the server and the browser according to the target container login request" may include the following operations:

S1021: Establish a Hypertext Transfer Protocol over Secure Socket Layer (https) connection between the server and the browser according to the Hypertext Transfer Protocol and the target container login request.

S1022: Convert the https connection into the first connection based on the WebSocket protocol (a full-duplex communication protocol).

Specifically, for example, based on the Hypertext Transfer Protocol (HTTP), the user establishes the https connection between the server and the browser through the target container login request transmitted by the browser, and then converts the https connection into the first connection based on the WebSocket protocol. The first connection is a Web Secure Socket (wss) connection.

The https connection is a communication connection established according to the Hypertext Transfer Protocol and may be used for implementing connection of communication between the browser and the server.

The WebSocket protocol is a full-duplex communication protocol based on the Transmission Control Protocol (TCP). The WebSocket protocol may implement full-duplex communication between the browser and the server. The https connection may be converted into the wss connection according to the WebSocket protocol. The wss connection may be used for implementing full-duplex communication between the browser and the server.

The method for converting the https connection into the wss connection based on the WebSocket protocol may use the related technology and is not described in detail herein.

The https connection is a "short connection". The https connection actively releases a connection after a connection request ends each time. Therefore, an online state of the client needs to be maintained, and the client needs to continuously initiate the connection request to the server. Even if the client does not need to obtain any data, the client also needs to transmit a request for "maintaining connection" to the server at an interval of a fixed time. The server replies to the client after receiving the request, based on a determination that the client is "online". If the server does not receive the connection request of the client for a certain period or longer, the client is considered to be "offline". If the client does not receive a reply from the server for a certain period or longer, a network is considered to be disconnected.

In addition, communication of the https connection can only be initiated by the client to the server, and the https connection cannot make the server actively push data to the client. Based on the https connection, if the server needs to transmit data to the client, the server can transmit data back to the client only after the client transmits the request.

In an example embodiment, the browser is used as the client. That the user logs in to the container through the browser, executes a command in the container, and obtains a feedback from the server requires the browser and the server to maintain a constant and long-term connection. However, this cannot be achieved by the https connection. Therefore, in an example embodiment, the https connection is converted into the wss connection based on the WebSocket protocol.

Operation S103: Obtain, according to the identifier of the container cluster, an address of a control node corresponding to the container cluster in which the target container is located.

For example, after the wss connection is established between the browser and the server, the server searches for the address of the control node corresponding to the container cluster according to the identifier of the container cluster in which the target container is located.

Operation S104: Establish a second connection between the server and the target container according to the address of the control node and the identifier of the target container, to log in to the target container.

After the first connection between the browser and the server and the second connection between the server and the target container are established, it indicates that the target container is logged in to.

A container cluster management system is a system for managing the container. In some implementations, the container cluster management system may be Kubernetes, Swarm, Mesos, ECS, or the like.

A connection control component is used for implementing a communication connection between the server and the target container. Using Kubernetes as an example, the connection control component may be a kubectl component. The kubectl component may transmit the received command to a container managed by Kubernetes after being formatted. Therefore, the kubectl component may be used as an operation entry of the Kubernetes container cluster management system.

The second connection is a communication connection established between the server and the target container.

Figure 3A:
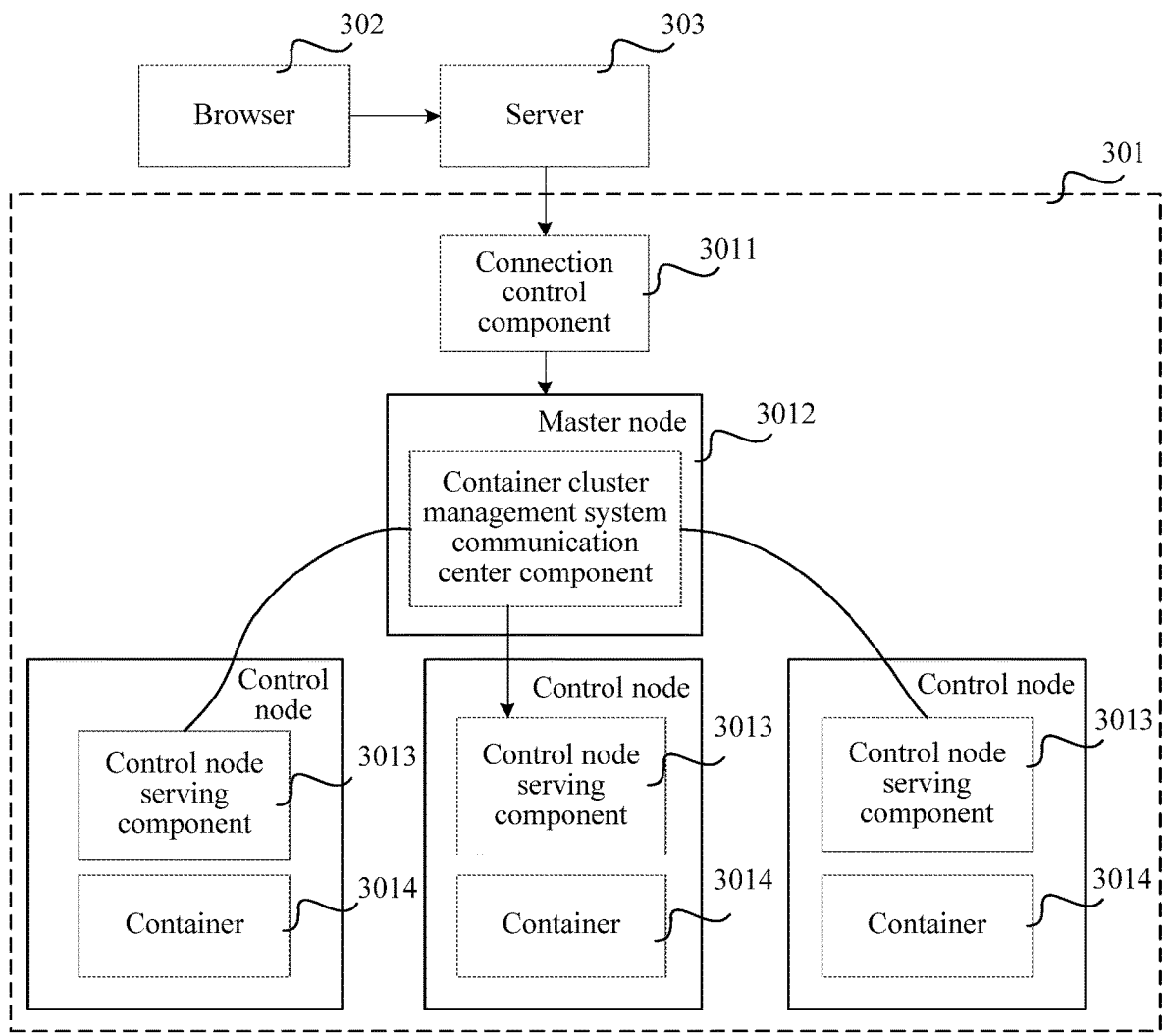
FIG. 3a is a diagram illustrating a configuration of a container login system according to an example embodiment.

An example embodiment in which the container is a docker container, and the container cluster management system is Kubernetes is described. FIG. 3a is a diagram illustrating a configuration of a container login system according to an example embodiment. A container cluster management system Kubernetes 301 is represented in a dotted line in FIG. 3a. The container cluster management system Kubernetes 301 includes a connection control component 3011, that is, a kubectl component 3011, a container cluster management system communication center component 3012, that is, an API Server component 3012, located on a master node, a control node serving component 3013, that is, a kubelet component 3013, and a docker container 3014. The kubelet component 3013 and the docker container 3014 may compose a control node, also referred to as a node. Each node may include one or more docker containers. The Kubernetes 301 may include one or more nodes.

In an example embodiment, through the first connection between the browser and the server and the second connection between the server and the target container, the user may conveniently log in to the target container through the browser. Therefore, the user does not need to search for a node in which the target container is located, and does not need to manually input a docker command. Accordingly, in an example embodiment, an operation for the user to log in to the container can be simplified, and efficiency is improved, and user experience in utilizing the user terminal may be improved.

Figure 2D:
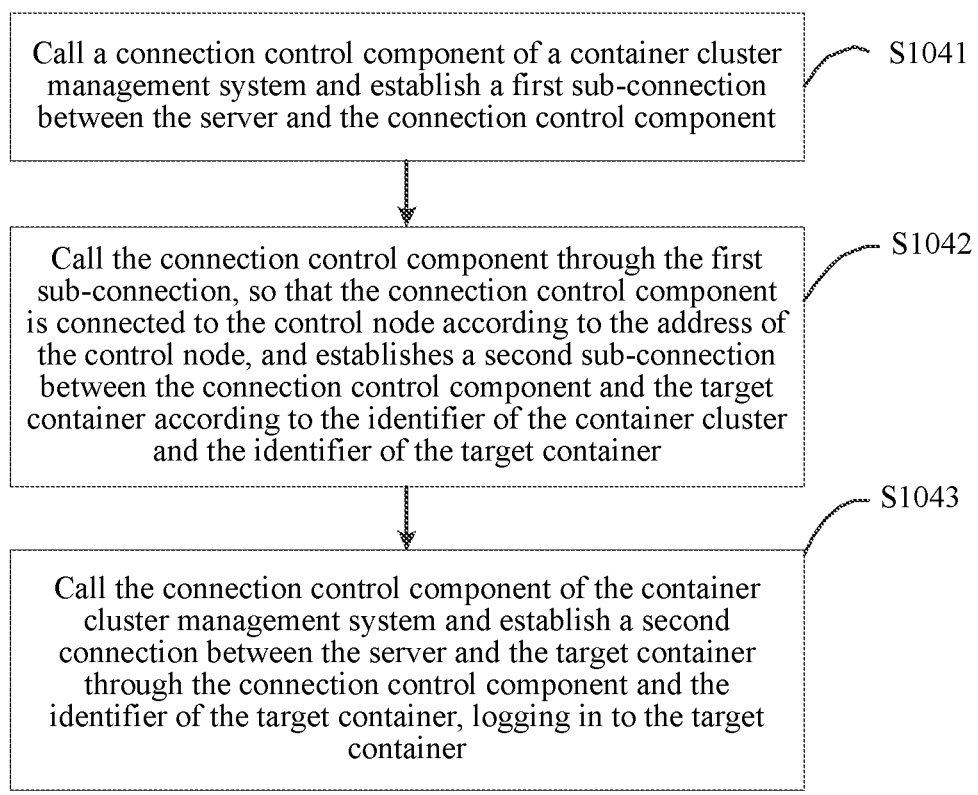
FIG. 2d is a flowchart of a method for establishing a second connection between a server and a target container according to an example embodiment.

FIG. 2d is a flowchart of a method for establishing a second connection between a server and a target container according to an example embodiment. In some implementations, as shown in FIG. 2d, operation S104 of "establishing a second connection between the server and the target container according to the address of the control node and the identifier of the target container" in FIG. 2a may include:

S1041: Call a connection control component of a container cluster management system and establish a first sub-connection between the server and the connection control component.

S1042: Call the connection control component through the first sub-connection, so that the connection control component is connected to the control node according to the address of the control node, and establishes a second sub-connection between the connection control component and the target container according to the identifier of the container cluster and the identifier of the target container.

S1043: Determine the first sub-connection and the second sub-connection as the second connection between the server and the target container.

The first sub-connection is a communication connection established between the server and the connection control component. It may be understood that after the first sub-connection is established between the server and the connection control component, the server may call the connection control component through the first sub-connection.

The second sub-connection is a communication connection established between the connection control component and the target container. The connection control component and the target container may establish a connection through another component. Using Kubernetes as an example, the kubectl component and the target container may establish a connection through the API Server component and the kubelet component. The API Server component 3012 and the kubelet component 3011 are both components included in Kubernetes.

Specifically, still using FIG. 3a as an example, the connection control component 3011 (or the kubectl component 3011) is connected to the container cluster management system communication center component 3012 (or the API Server component 3012), the container cluster management system communication center component 3012 (or the API Server component 3012) is connected to the control node server component 3013 (or the kubelet component 3013), and the control node server component 3013 (or the kubelet component 3013) is connected to the target container 3014.

In a Kubernetes system, the kubelet component is used for communicating with the container.

In the Kubernetes system, the API Server component may be used as a communication center between modules inside the Kubernetes system.

In an example embodiment, the user logs in to the target container through the browser interface, simplifying a login operation and improving operation efficiency, thereby improving user experience.

Figure 2E:
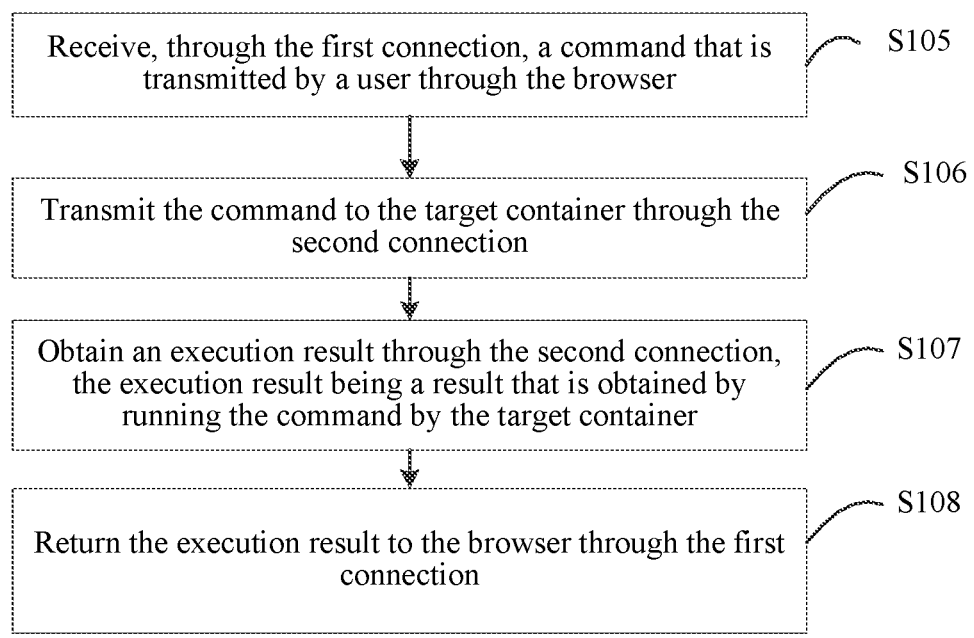
FIG. 2e is a flowchart showing that a browser and a target container communicate after the target container is logged in according to an example embodiment.

FIG. 2e is a flowchart showing that a browser and a target container communicate after the target container is logged in according to an example embodiment. As shown in FIG. 2e, after the target container is logged in to, the user may input any command and execute the command in the container, and an execution result may be returned to the browser of the user through the second connection and the first connection. For example, in some implementations, after the target container is logged in to, operations S105-S108 may further be included:

S105: Receive, through the first connection, a command that is transmitted by a user through the browser.

S106: Transmit the command to the target container through the second connection.

S107: Obtain an execution result through the second connection, the execution result being a result that is obtained by running the command by the target container.

S108: Return the execution result to the browser through the first connection.

The command that is transmitted by the user through the browser may be any command, such as an upload command, a download command, a compression command, or a decompression command.

In an example embodiment, the user may transmit the command to the target container through the browser and receive the execution result that is obtained by executing the command by the target container.

It may be understood that after the browser receives the execution result, the execution result may be parsed into human-readable characters. Specifically, for example, the browser parses the execution result into human-readable characters through an hterm framework. The hterm framework is a tool that the browser usually has and that parses a computer language into human-readable characters.

Figure 2F:
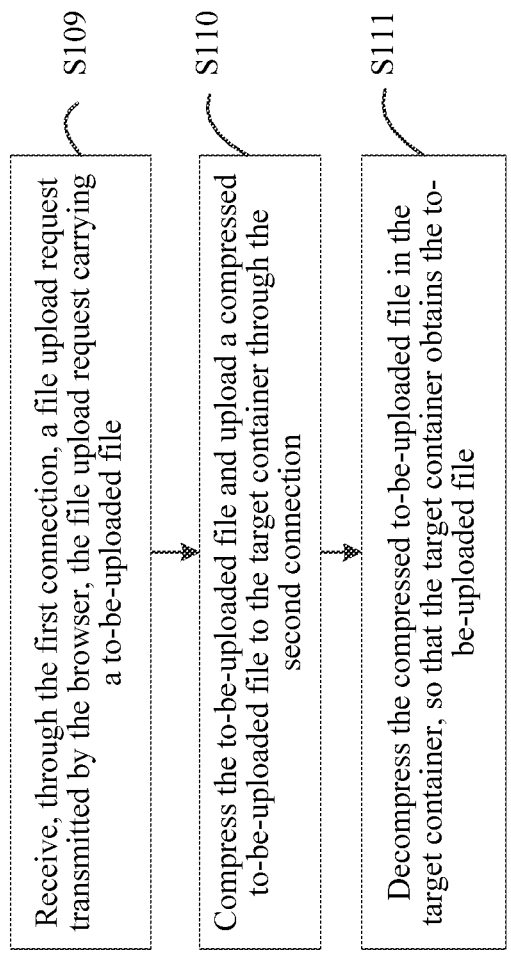
FIG. 2f is a flowchart of a method for a browser to upload a file to a target container according to an example embodiment.

FIG. 2f is a flowchart of a method for a browser to upload a file to a target container according to an example embodiment. As shown in FIG. 2f, after the target container is logged in to, the user may upload a file to the target container. For example, in some implementations, after the target container is logged in to, an operation of uploading a file to the target container may be performed, including:

S109: Receive, through the first connection, a file upload request transmitted by the browser, the file upload request carrying a to-be-uploaded file.

S110: Compress the to-be-uploaded file and upload a compressed to-be-uploaded file to the target container through the second connection.

S111: Decompress the compressed to-be-uploaded file in the target container, so that the target container obtains the to-be-uploaded file.

The server may compress the to-be-uploaded file in a local memory of the server. For example, the server may compress the to-be-uploaded file by using a tar command, so that the server may execute the tar command in the target container to decompress the compressed to-be-uploaded file. The tar command is a common compression and decompression command.

After the to-be-uploaded file is uploaded to the target container, the server may return an upload result to the browser.

In the related technology, the file is not compressed when the file is uploaded to the container, and as a result, information errors and omissions are easily caused in a process of uploading the file, and quality of file transmission cannot be ensured. On the other hand, in an example embodiment, the server may locally compress the to-be-uploaded file and transmit the compressed to-be-uploaded file to the target container, to reduce bandwidth required for file transmission and improve efficiency of file uploading. In addition, after the target container receives the compressed to-be-uploaded file, the server executes a decompression command in the target container and recovers the to-be-uploaded file, to prevent information error and omission in the process of uploading the file, so that the to-be-uploaded file uploaded by the user is recovered to the maximum extent, ensuring file transmission quality.

A series of operations of compressing the to-be-uploaded file, transmitting the to-be-uploaded file, decompressing the to-be-uploaded file, and the like that are performed after the server receives the file upload request transmitted by the browser are automatically performed by the server, and the user does not need to manually input the command.

In the related technology, after the user logs in to the container, if the user needs to upload a file to the container, the user needs to restart the container to upload a file to the container. On the other hand, in an example embodiment, after logging in to the target container through the browser, the user does not need to restart the target container but may transmit a file to the target container through the browser and upload the file to the target container. Therefore, in an example embodiment, an operation for the user to upload a file to the target container is also simplified, and efficiency of uploading a file to the target container is improved.

Figure 2G:
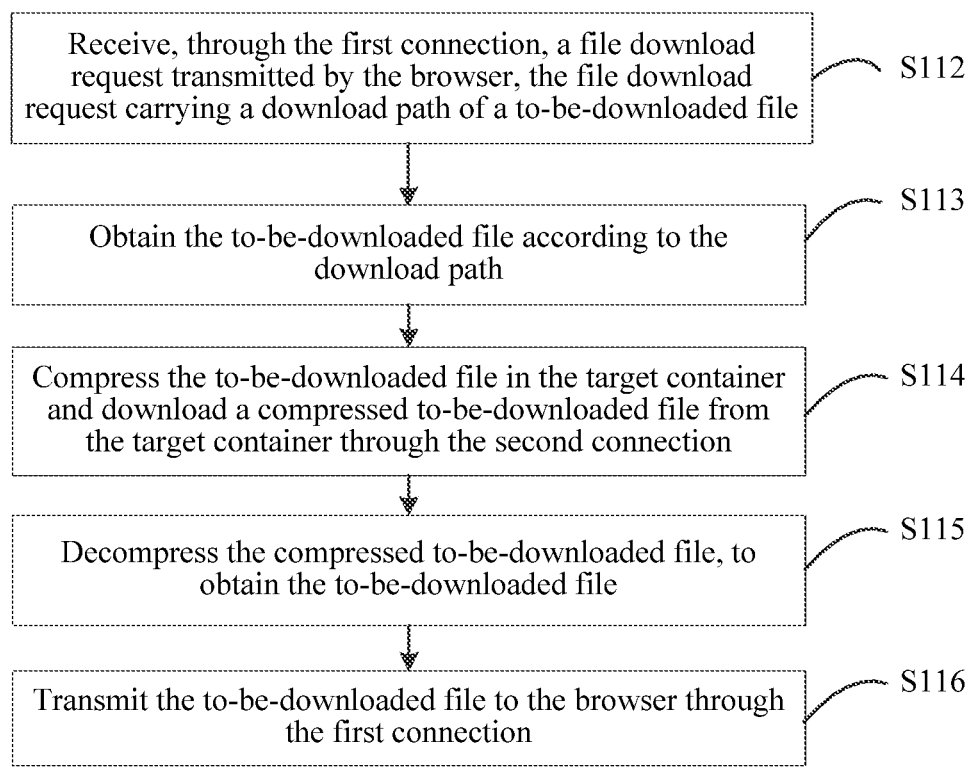
FIG. 2g is a flowchart of a method for a browser to download a file from a target container according to an example embodiment.

FIG. 2g is a flowchart of a method for a browser to download a file from a target container according to an example embodiment. As shown in FIG. 2g, after the target container is logged in to, the user may download a file from the target container. For example, in some implementations, after the target container is logged in to, an operation of downloading a file from the target container may be performed, including:

S112: Receive, through the first connection, a file download request transmitted by the browser, the file download request carrying a download path of a to-be-downloaded file.

S113: Obtain the to-be-downloaded file according to the download path.

S114: Compress the to-be-downloaded file in the target container and download a compressed to-be-downloaded file from the target container through the second connection.

S115: Decompress the compressed to-be-downloaded file, to obtain the to-be-downloaded file.

S116: Transmit the to-be-downloaded file to the browser through the first connection.

The download path is a storage path of the to-be-downloaded file, so that the to-be-downloaded file can be found according to the download path.

The server may execute the tar command in the target container to compress the to-be-downloaded file, so that the server may decompress the to-be-downloaded file in a local memory of the server.

In the related technology, the file is not compressed when the file is downloaded from the container, and as a result, information errors and omissions are easily caused in a process of downloading the file, and quality of file transmission cannot be ensured. In an example embodiment, the server may compress the to-be-downloaded file in the target container and transmit the compressed to-be-downloaded file to the browser, to reduce bandwidth required for file transmission and improve efficiency of file downloading. In addition, after the server receives the compressed to-be-downloaded file, the server locally executes a decompression command and recovers the to-be-downloaded file, to prevent information error and omission in the process of downloading the file, so that the file downloaded by the user from the target container is recovered to the maximum extent, ensuring file transmission quality.

A series of operations of compressing the to-be-downloaded file, transmitting the to-be-downloaded file, decompressing the to-be-downloaded file, and the like that are performed after the server receives the file download request transmitted by the browser are automatically performed by the server, and the user does not need to manually input the command.

In the related technology, after the user logs in to the container, if the user needs to download a file from the container, the user needs to restart the container to download a file from the container. On the other hand, in an example embodiment, after logging in to the target container through the browser, the user does not need to restart the target container but may download the file from the container through the browser. Therefore, in an example embodiment, an operation for the user to download a file from the target container is also simplified, and efficiency of downloading a file from the target container is improved.

In some implementations, a speed of transmitting a file (e.g., uploading a file or downloading a file) between the target container and the browser may also be controlled. For example, controlling a speed of transmitting a file between the target container and the browser may specifically include operations:

setting a timing length of a timer and a limiting speed for file transmission; and controlling a file size of a transmitted file within each timing length according to the timing length and the limiting speed, the transmitted file including a file downloaded from the target container and/or a file uploaded to the target container.

The timing length is a time length set by a timer each time.

The limiting speed is a maximum speed for transmitting a file.

A file size of a file transmitted within each timing length may be calculated according to the timing length and the limiting speed. For example, the file size may be determined based on an equation, Bufsize=limiting speed (kbyte/s)× timing length (ms). Bufsize refers to a file size of a file transmitted within each timing length.

It may be known from the above descriptions that in an example embodiment, the first connection between the browser and the server is established, and the second connection is established between the server and the target container. Accordingly, the user can log in to the target container through a browser (web) interface. Also, an operation for the user to log in to the target container is simplified, and operation efficiency is improved.

According to the method described in the foregoing embodiment(s), the following further provides detailed descriptions by using an example.

In an example embodiment, the descriptions are provided by using an example in which the container login apparatus is specifically integrated in the server. In an example embodiment, the container may be a docker container, and the container cluster management system may be Kubernetes. As described above, FIG. 3a illustrates a configuration of a container login system according to an example embodiment. The container login system includes a browser 302, a server 303, a connection control component 3011, which may be, for example, a kubectl component 3011, a container cluster management system communication center component 3012, which may be, for example, an API Server component 3012, a control node server component 3013, which may be, for example, a kubelet component 3013, and a container 3014, which may be, for example, a docker container 3014. The container login apparatus is integrated in the server.

The container cluster management system may include at least one server. In some implementations, the container cluster management system may include two or more servers, thereby saving operating costs and reducing system redundancy. Also, the two or more servers may mutually backup each other, thereby improving security.

Figure 3B:
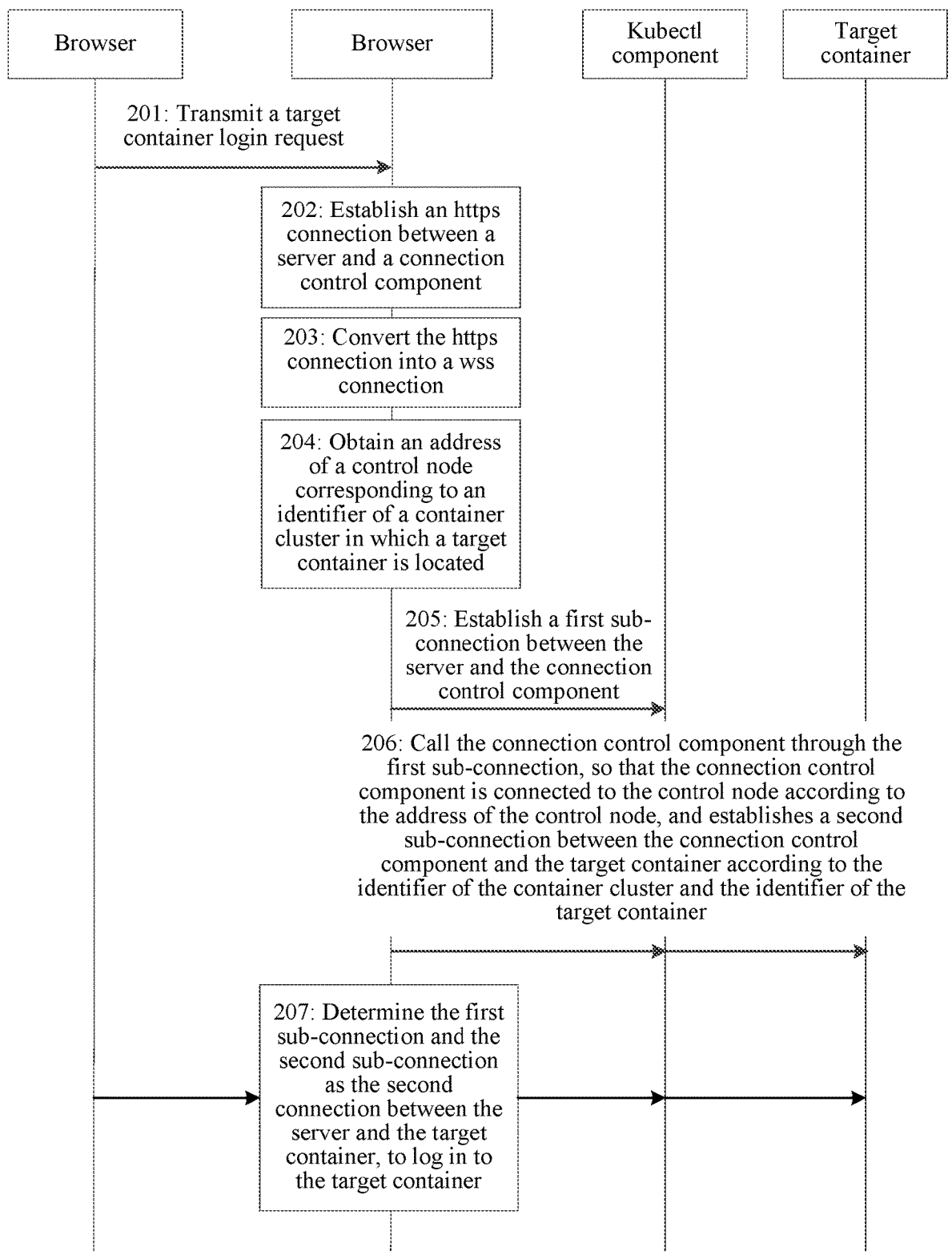
FIG. 3b is a schematic interaction diagram of a scenario of a container login method according to an example embodiment.

As shown in FIG. 3b, an example embodiment provides a container login method, applied to a server. The container login method may include operations S202 to S207:

Operation 201: A user transmits a target container login request to a server through a browser, the target container login request including an identifier of a target container and an identifier of a container cluster in which the target container is located.

Operation 202: The server establishes an https connection between the server and the browser in response to the target container login request.

For example, when the server receives the target container login request that is transmitted by the user through the browser, the server establishes the https connection between the server and the browser according to the target container login request.

Operation 203: The server converts the https connection into a wss connection based on the WebSocket protocol and determines the wss connection as the first connection. The https connection is a "short connection". The https connection actively releases a connection after a connection request ends each time. Therefore, an online state of the client needs to be maintained, and the client needs to continuously initiate the connection request to the server. Even if the client does not need to obtain any data, the client also needs to transmit a request for "maintaining connection" to the server at an interval of a fixed time. The server replies to the client after receiving the request, based on a determination that the client is "online". If the server does not receive the connection request of the client for a certain period or longer, the client is considered to be "offline". If the client does not receive a reply from the server for a certain period or longer, a network is considered to be disconnected.

In addition, communication of the https connection can only be initiated by the client to the server, and the https connection cannot make the server actively push data to the client. Based on the https connection, if the server needs to transmit data to the client, the server can transmit data back to the client only after the client transmits the request.

In an example embodiment, the browser is used as the client. That the user logs in to the container through the browser, executes a command in the container, and obtains a feedback from the server requires the browser and the server to maintain a constant and long-term connection. However, this cannot be achieved by the https connection. Therefore, in an example embodiment, the https connection is converted into the wss connection based on the WebSocket protocol.

Operation 204: The server obtains, according to the identifier of the container cluster, an address of a control node corresponding to the identifier of the container cluster in which the target container is located.

Operation 205: The server calls a connection control component of a container cluster management system and establishes a first sub-connection between the server and the connection control component (or the kubectl component).

The first sub-connection between the server and the kubectl component may be pre-established, and the first sub-connection does not need to be established after operation 201 to operation 204 are performed.

Operation 206: The server calls the connection control component through the first sub-connection, so that the connection control component is connected to the control node according to the address of the control node, and establishes a second sub-connection between the connection control component and the target container according to the identifier of the container cluster and the identifier of the target container.

Operation 207: The server determines the first sub-connection and the second sub-connection as the second connection between the server and the target container, to log in to the target container.

After the first connection between the browser and the server and the second connection between the server and the target container are established, it indicates that the target container is logged in to.

The second sub-connection between the kubectl component and the target container may also be pre-established.

In the related technology, in order for the user to log in to the container managed by container, the user needs to manually input a command in the command line interface to search for a node in which the target container is located, then logs in to the node, manually inputs a command in the command line interface to search for the target container, and then logs in to the target container. On the other hand, in an example embodiment, the user may transmit the target container login request through the browser interface, and log in to the target container through the first connection between the browser and the server and the second connection between the server and the target container, so that a command does not need to be manually input in the command line interface, and it is not required that the node in which the target container is located is first logged in to, and the target container is then logged in to. Therefore, in an example embodiment, an operation for the user to log in to the container can be simplified, and efficiency for the user to log in to the container is improved, thereby improving user experience.

Specifically, in the related technology, when the user logs in to the container, the user needs to first input a get pods command in the command line interface to search for a node in which the container is located, and then manually input a docker command to log in to the container. However, in an example embodiment, when the container is logged in to, the user only needs to transmit the target container login request in the browser, the target container login request carrying a target container identifier of the target container, so that the server can call the kubectl component and execute an exec pod-id command through the kubectl component, to automatically find a location of the target container, and then communicate with the container through a kubelet component of a node in which the target container is located.

Figure 3C:
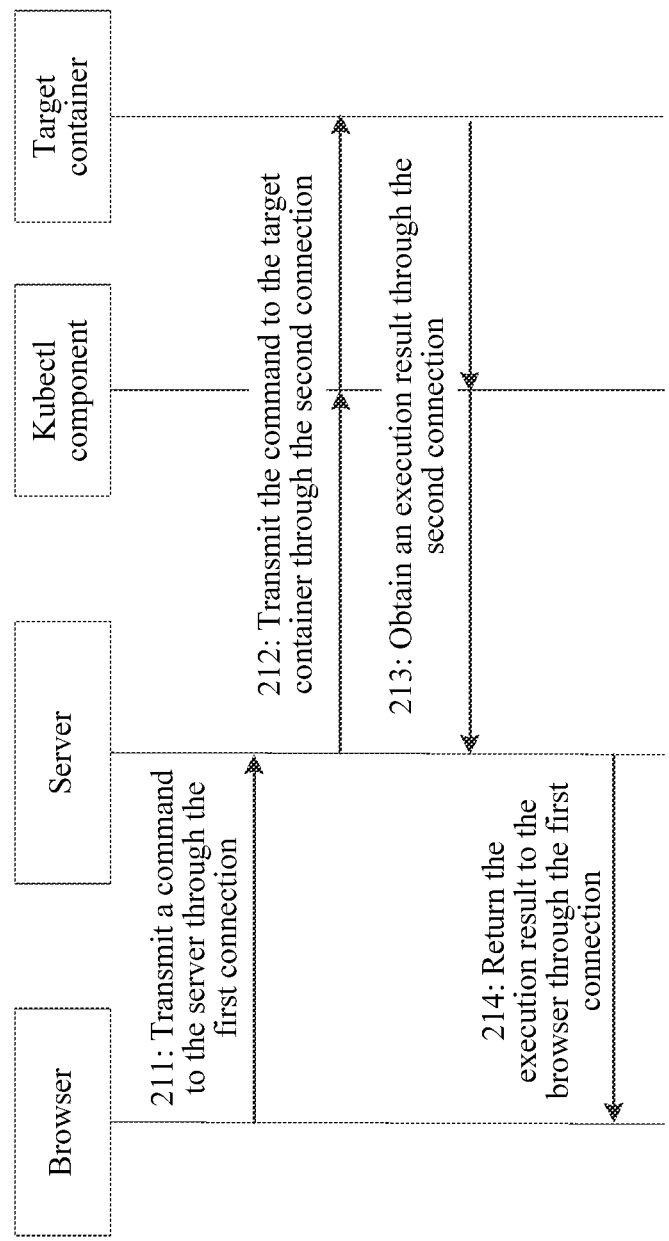
FIG. 3c is a schematic interaction diagram of executing a command in a container according to an example embodiment.

As shown in FIG. 3c, in some implementations, after the target container is logged in to, the following operations may further be included:

Operation 211: The browser transmits a command to the server through the first connection.

Operation 212: The server transmits the command to the target container through the second connection.

Operation 213: The server obtains an execution result through the second connection, the execution result being a result that is obtained by running the command by the target container.

Operation 214: The server returns the execution result to the browser through the first connection.

That is, after the user logs in to the target container, the server may transmit any command through the browser and execute the command in the target container, and obtain the execution result of the target container.

Figure 3D:
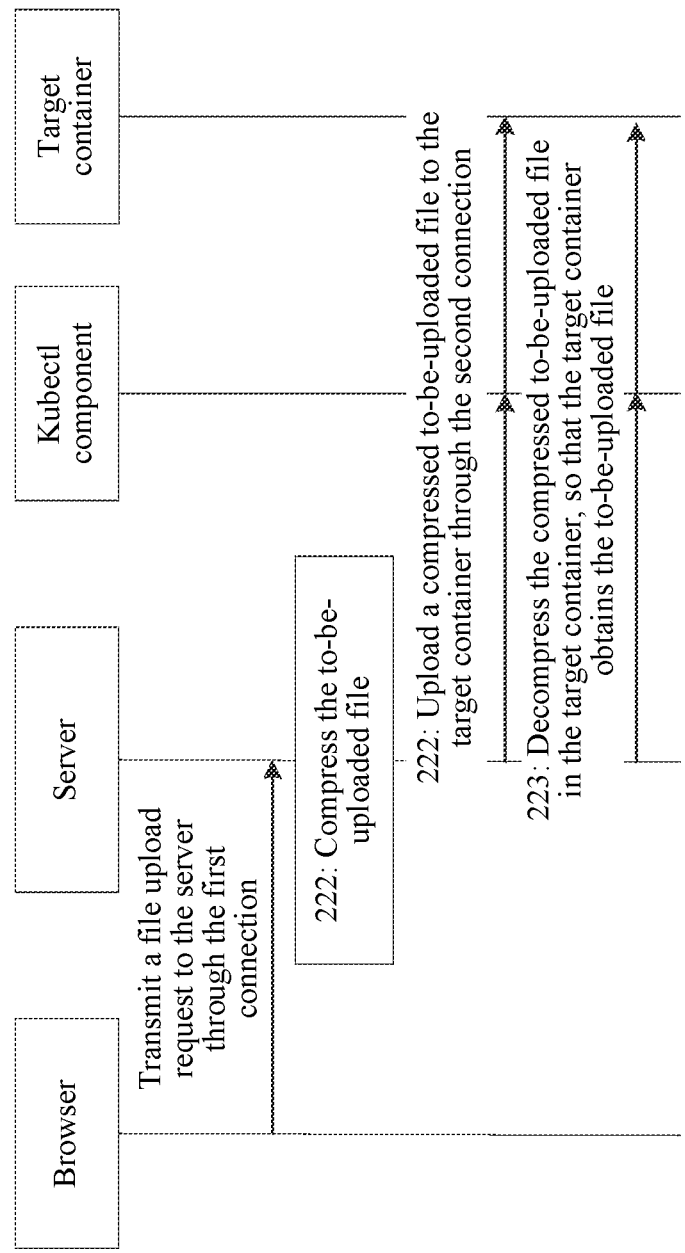
FIG. 3d is a schematic interaction diagram of uploading a file to a container according to an example embodiment.

As shown in FIG. 3d, in some implementations, after the target container is logged in to, an operation of uploading a file to the target container may be performed, including:

Operation 221: The browser transmits a file upload request to the server through the first connection, the file upload request carrying a to-be-uploaded file.

Operation 222: The server compresses the to-be-uploaded file and uploads a compressed to-be-uploaded file to the target container through the second connection.

Operation 223: The server decompresses the compressed to-be-uploaded file in the target container, so that the target container obtains the to-be-uploaded file.

In the related technology, in order for the user to upload a file to the container managed by Kubernetes, the user needs to copy the file to a data disk in a mounting manner and copy the file from the data disk to the target container. However, the container needs to be restarted each time mounting is performed. Therefore, in the related technology, an operation of uploading a file to the container managed by Kubernetes is complex and has low efficiency.

In an operating system such as a Linux operating system, mounting refers to mounting a device (which is usually a storage device) to an existing catalog. To access a file in the storage device, a partition in which the file is located needs to be mounted onto an existing catalog, and then the storage device is accessed by accessing the catalog.

In an example embodiment, the user may upload, through the browser, a file to the container managed by Kubernetes and does not need to restart the container, thereby simplifying a file uploading process. In addition, when the file is uploaded to the container managed by Kubernetes, the server locally compresses the file and then uploads the file to the target container, and then decompresses the file in the target container, to ensure quality of file transmission.

Figure 3E:
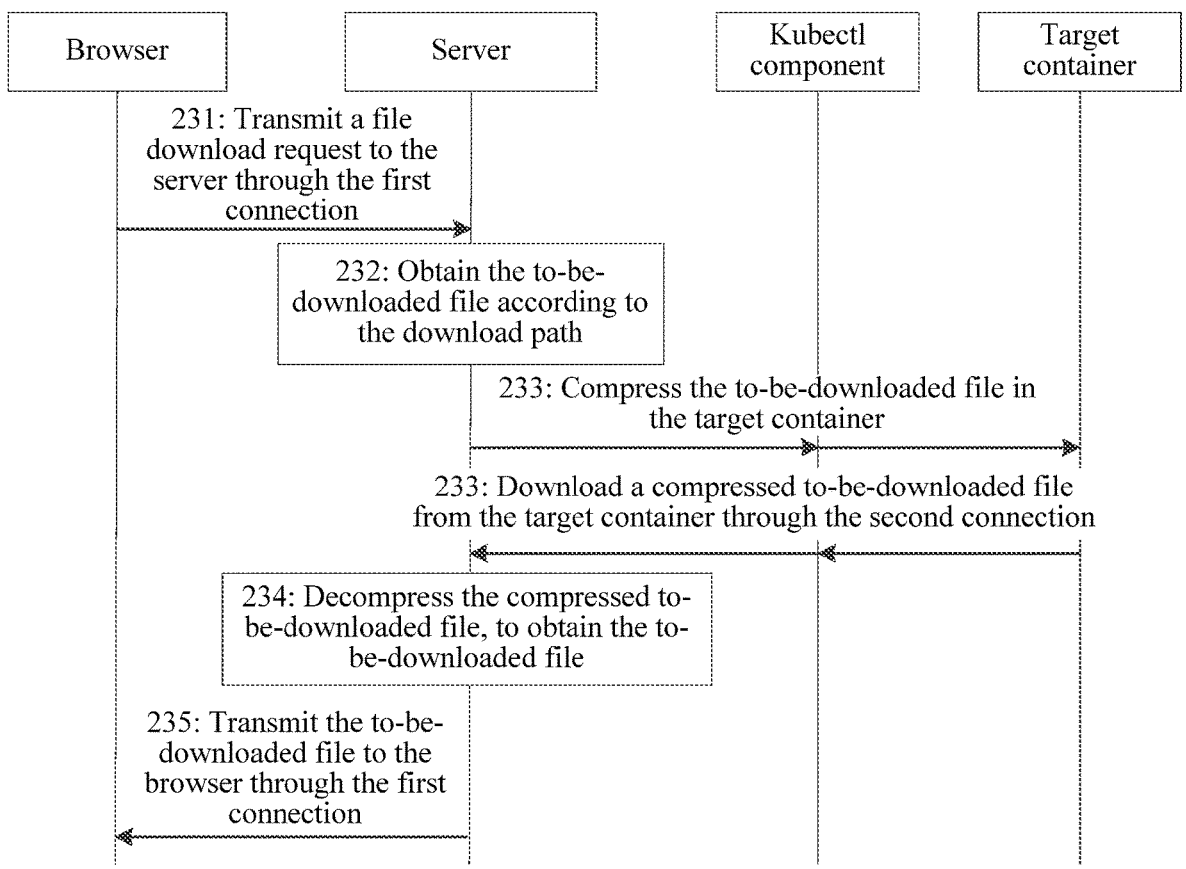
FIG. 3e is a schematic interaction diagram of downloading a file from a container according to an example embodiment.

As shown in FIG. 3e, in some implementations, after the target container is logged in to, an operation of downloading a file from the target container may be performed, including:

Operation 231: The browser transmits a file download request to the server through the first connection, the file download request carrying a download path of a to-be-downloaded file.

Operation 232: The server obtains the to-be-downloaded file according to the download path.

Operation 233: The server compresses the to-be-downloaded file in the target container and downloads a compressed to-be-downloaded file from the target container through the second connection.

Operation 234: The server decompresses the compressed to-be-downloaded file, to obtain the to-be-downloaded file.

Operation 235: The server transmits the to-be-downloaded file to the browser through the first connection.

In the related technology, in order for the user to download a file from the container managed by Kubernetes, the user needs to copy the file to a data disk in a mounting manner and copy the file from the data disk to a catalog specified by the user or a current catalog. However, the container needs to be restarted each time mounting is performed. Therefore, in the related technology, an operation of downloading a file from the container managed by Kubernetes is complex and has low efficiency.

In an example embodiment, the user may download, through the browser, a file from the container managed by Kubernetes and does not need to restart the container, and thus the file downloading process is simple. In addition, when the file is downloaded from the container managed by Kubernetes, the server compresses the file in the target container and then obtains the target container, then decompresses the file in the server, and transmits the file to the browser, to ensure quality of file transmission.

It may be known from the above descriptions that in an example embodiment, the first connection between the browser and the server is established, and the second connection is established between the server and the target container. Accordingly, the user can log in to the target container through a browser (web) interface. Also, an operation for the user to log in to the target container is simplified, and operation efficiency is improved.

An example embodiment further provides a container login apparatus. The container login apparatus may be specifically integrated in a device such as the server.

Figure 4A:
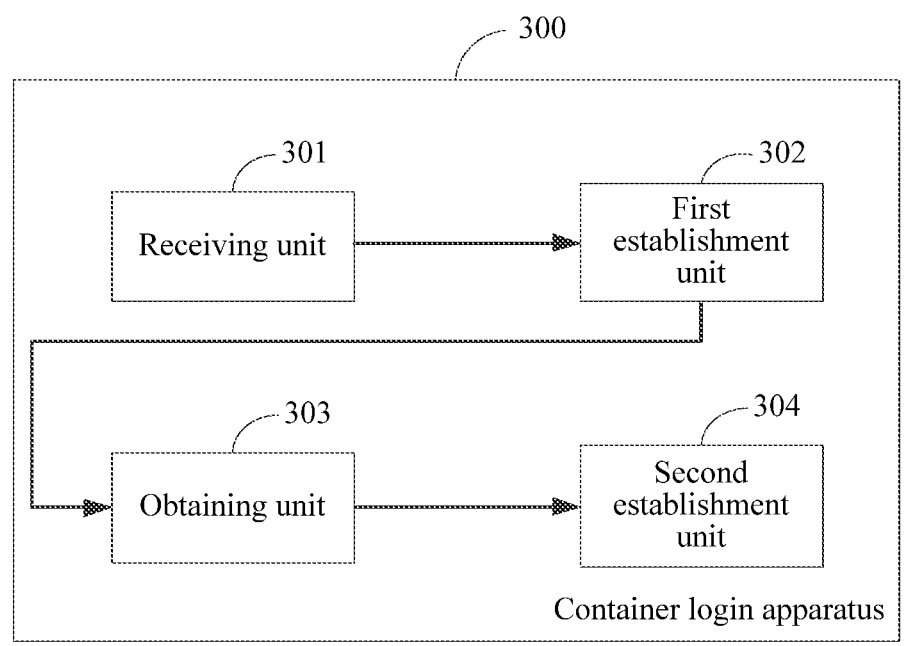
FIG. 4a is a schematic structural diagram of a login apparatus according to an example embodiment.

For example, as shown in FIG. 4a, the container login apparatus 300 may include a receiving unit 301, a first establishment unit 302, an obtaining unit 303, and a second establishment unit 304, which are described in detail below.

(1) Receiving Unit 301

The receiving unit 301 is configured to receive a target container login request transmitted by a browser, the target container login request including an identifier of a target container and an identifier of a container cluster in which the target container is located.

In some embodiments, the identifier (ID, identification) of the target container refers to a code for indicating an identity of a container, for example, a character string including numbers and letters.

In the container cluster, a unique container ID may be set for each container in advance.

For example, the receiving unit 301 may receive the target container login request that is transmitted by the user through the browser. The target container login request is used for requesting to log in to the target container.

The target container is a container that the user wishes to log in to and is located in the container cluster. The target container may be any container. For example, in some implementations, the target container may be a docker container. The container may provide isolated running space to an application program. Each container contains exclusive complete user environment space, and change of a container does not affect running environments of other containers.

In the related technology, a plurality of commands need to be input in a command line interface in a process of logging in to the container. The command line interface may be a shell interface. The shell interface is a user interface for providing an interaction operation between the user and a kernel. The shell interface may receive the commands input by the user and transmit the commands to the container for execution. However, a plurality of particular commands, for example, a command for searching for a node, a command for logging in to a node, a command for searching for a container, and a command for logging in to a container, need to be input when the container is logged in to through the command line interface. Therefore, a container login manner in the related technology has complex operations, low efficiency, and poor user experience.

In an example embodiment, a browser interface may be provided to the user. For example, as shown in FIG. 2b, the user may directly log in to the container through the browser interface and does not need to input a plurality of commands in the command line interface. Therefore, in an example embodiment, the browser interface is provided, to simplify an operation for logging in to the container and improve efficiency, thereby improving user experience.

(2) First Establishment Unit 302

The first establishment unit 302 is configured to establish a first connection between the server and the browser in response to the target container login request.

For example, the first establishment unit 302 establishes the first connection between the server and the browser in response to the target container login request transmitted by the user.

The first connection is used for implementing communication between the server and the browser. A method for establishing the first connection between the server and the browser may be determined according to actual requirements. For example, in some implementations, the first establishment unit 302 may be specifically configured to:

(1) establish a Hypertext Transfer Protocol over Secure Socket Layer https connection between the server and the browser according to the Hypertext Transfer Protocol and the target container login request; and (2) convert the Hypertext Transfer Protocol over Secure Socket Layer https connection into the first connection based on a full-duplex communication WebSocket protocol.

Specifically, for example, the first establishment unit 302 may establish, based on the Hypertext Transfer Protocol (HTTP), the https connection between the server and the browser through the target container login request transmitted by the browser, and then convert the https connection into the first connection based on a full-duplex communication protocol, for example, the WebSocket protocol (a full-duplex communication protocol). The first connection is a wss connection.

The https connection is a communication connection established according to the Hypertext Transfer Protocol and may be used for implementing connection of communication between the browser and the server.

The WebSocket protocol is a full-duplex communication protocol based on the Transmission Control Protocol (TCP). The WebSocket protocol may implement full-duplex communication between the browser and the server. The https connection may be converted into the wss connection according to the WebSocket protocol. The wss connection may be used for implementing full-duplex communication between the browser and the server.

The method for converting the https connection into the wss connection based on the WebSocket protocol may use the related technology and is not described in detail herein.

The https connection is a "short connection". The https connection actively releases a connection after a connection request ends each time. Therefore, an online state of the client needs to be maintained, and the client needs to continuously initiate the connection request to the server. Even if the client does not need to obtain any data, the client also needs to transmit a request for "maintaining connection" to the server at an interval of a fixed time. The server replies to the client after receiving the request, based on a determination that the client is "online". If the server does not receive the connection request of the client for a certain period or longer, the client is considered to be "offline". If the client does not receive a reply from the server for a certain period or longer, a network is considered to be disconnected.

In addition, communication of the https connection can only be initiated by the client to the server, and the https connection cannot make the server actively push data to the client. Based on the https connection, if the server needs to transmit data to the client, the server can transmit data back to the client only after the client transmits the request.

In an example embodiment, the browser is used as the client. That the user logs in to the container through the browser, executes a command in the container, and obtains a feedback from the server requires the browser and the server to maintain a constant and long-term connection. However, this cannot be achieved by the https connection. Therefore, in an example embodiment, the https connection is converted into the wss connection based on the WebSocket protocol.

(3) Obtaining Unit 303

The obtaining unit 303 is configured to obtain, according to the identifier of the container cluster, an address of a control node corresponding to the container cluster in which the target container is located.

For example, the obtaining unit 303 obtains, through the wss connection between the browser and the server, the address of the control node corresponding to the container cluster in which the target container is located.

(4) Second Establishment Unit 304

The second establishment unit 304 is configured to establish a second connection between the server and the target container according to the address of the control node and the identifier of the target container, to log in to the target container.

After the first connection between the browser and the server and the second connection between the server and the target container are established, it indicates that the target container is logged in to.

A container cluster management system is a system for managing the container. In some implementations, the container cluster management system may be Kubernetes, Swarm, Mesos, ECS, or the like.

A connection control component is used for implementing a communication connection between the server and the target container. Using Kubernetes as an example, the connection control component may be a kubectl component. The kubectl component may transmit the received command to a container managed by Kubernetes after being formatted. Therefore, the kubectl component may be used as an operation entry of the Kubernetes container cluster management system.

The second connection is a communication connection established between the server and the target container.

In an example embodiment, through the first connection between the browser and the server and the second connection between the server and the target container, the user may conveniently log in to the target container through the browser, does not need to search for a node in which the target container is located, and does not need to manually input a docker command. Therefore, in an example embodiment, an operation for the user to log in to the container can be simplified, and efficiency is improved, thereby improving user experience.

In some implementations, the second establishment unit 304 may be specifically configured to:

(1) call a connection control component of a container cluster management system and establish a first sub-connection between the server and the connection control component;

(2) call the connection control component through the first sub-connection, so that the connection control component is connected to the control node according to the address of the control node, and establishes a second sub-connection between the connection control component and the target container according to the identifier of the container cluster and the identifier of the target container; and (3) determine the first sub-connection and the second sub-connection as the second connection between the server and the target container.

The first sub-connection is a communication connection established between the server and the connection control component. It may be understood that after the first sub-connection is established between the server and the connection control component, the server may call the connection control component through the first sub-connection.

The second sub-connection is a communication connection established between the connection control component and the target container. The connection control component and the target container may establish a connection through another component. Using Kubernetes as an example, the kubectl component and the target container may establish a connection through the API Server component and the kubelet component. Specifically, for example, the kubectl component is connected to the API Server component, the API Server component is connected to the kubelet component, and the kubelet component is connected to the target container. The API Server component and the kubelet component are both components included in Kubernetes.

In a Kubernetes system, the kubelet component is used for communicating with the container.

In the Kubernetes system, the API Server component may be used as a communication center between modules inside the Kubernetes system.

In an example embodiment, the user logs in to the target container through the browser interface, simplifying a login operation and improving operation efficiency, thereby improving user experience.

Figure 4B:
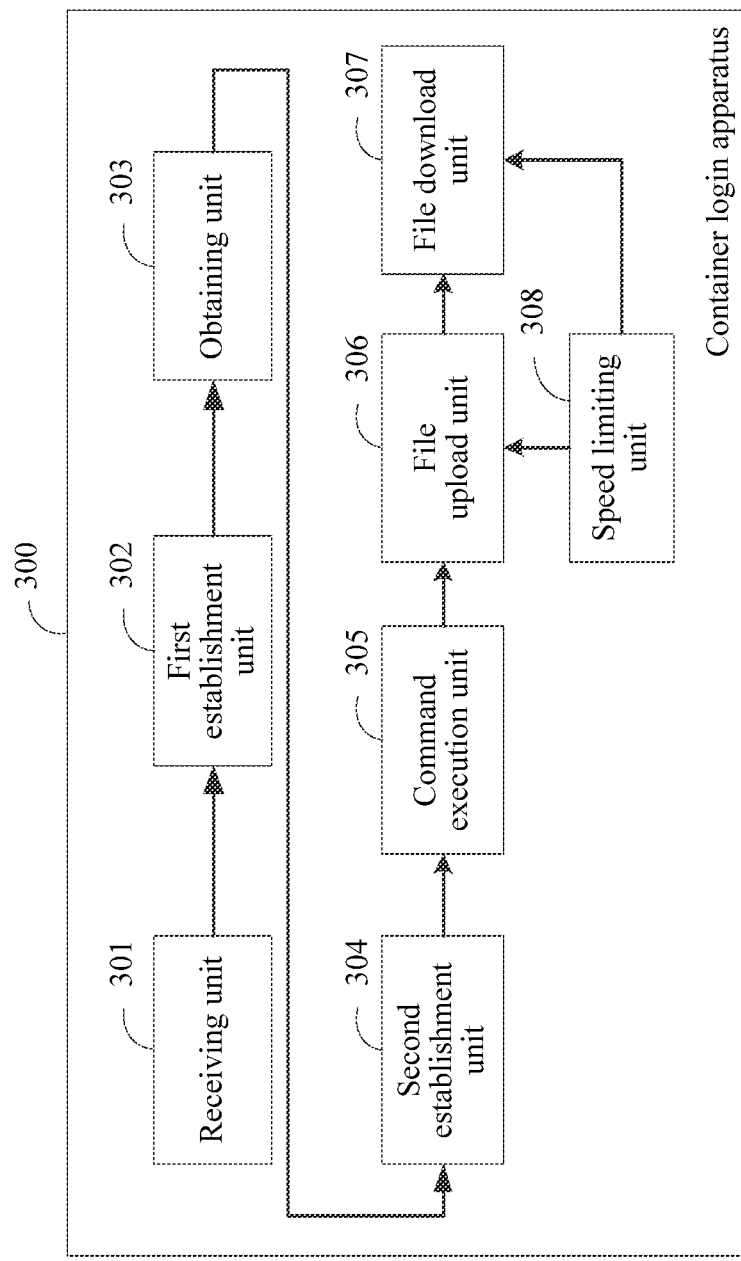
FIG. 4b is another schematic structural diagram of a login apparatus according to an example embodiment.

After the target container is logged in to, the user may input any command and execute the command in the container, and an execution result may be returned to the browser of the user through the second connection and the first connection. For example, as shown in FIG. 4b, in some implementations, the container login apparatus 300 may further include a command execution unit 305. The command execution unit 305 may be configured to:

(1) receive, through the first connection, a command that is transmitted by a user through the browser;

(2) transmit the command to the target container through the second connection;

(3) obtain an execution result through the second connection, the execution result being a result that is obtained by running the command by the target container; and (4) return the execution result to the browser through the first connection.

The command that is transmitted by the user through the browser may be any command, such as an upload command, a download command, a compression command, or a decompression command.

In an example embodiment, the user may transmit the command to the target container through the browser and receive the execution result that is obtained by executing the command by the target container.

It may be understood that after the browser receives the execution result, the execution result may be parsed into human-readable characters. Specifically, for example, the browser parses the execution result into human-readable characters through an hterm framework. The hterm framework is a tool that the browser usually has and that parses a computer language into human-readable characters.

After the target container is logged in to, the user may upload a file to the target container. For example, in some implementations, as shown in FIG. 4b, the container login apparatus 300 may further include a file upload unit 306. The file upload unit 306 may be configured to:

receive, through the first connection, a file upload request transmitted by the browser, the file upload request carrying a to-be-uploaded file;

compress the to-be-uploaded file and upload a compressed to-be-uploaded file to the target container through the second connection; and decompress the compressed to-be-uploaded file in the target container, so that the target container obtains the to-be-uploaded file.

The server may compress the to-be-uploaded file in a local memory of the server. For example, the server may compress the to-be-uploaded file by using a tar command, so that the server may execute the tar command in the target container to decompress the compressed to-be-uploaded file. The tar command is a common compression and decompression command.

After the to-be-uploaded file is uploaded to the target container, the server may return an upload result to the browser.

In the related technology, the file is not compressed when the file is uploaded to the container, and as a result, information errors and omissions are easily caused in a process of uploading the file, and quality of file transmission cannot be ensured. However, in an example embodiment, the server may locally compress the to-be-uploaded file and transmit the compressed to-be-uploaded file to the target container, to reduce bandwidth required for file transmission and improve efficiency of file uploading. In addition, after the target container receives the compressed to-be-uploaded file, the server executes a decompression command in the target container and recovers the to-be-uploaded file, to prevent information error and omission in the process of uploading the file, so that the to-be-uploaded file uploaded by the user is recovered to the maximum extent, ensuring file transmission quality.

A series of operations of compressing the to-be-uploaded file, transmitting the to-be-uploaded file, decompressing the to-be-uploaded file, and the like that are performed after the server receives the file upload request transmitted by the browser are automatically performed by the server, and the user does not need to manually input the command.

In the related technology, after the user logs in to the container, if the user needs to upload a file to the container, the user needs to restart the container to upload a file to the container. However, in an example embodiment, after logging in to the target container through the browser, the user does not need to restart the target container but may transmit a file to the target container through the browser and upload the file to the target container. Therefore, in an example embodiment, an operation for the user to upload a file to the target container is also simplified, and efficiency of uploading a file to the target container is improved.

After the target container is logged in to, the user may download a file from the target container. For example, in some implementations, as shown in FIG. 4b, the container login apparatus 300 may further include a file download unit 307. The file download unit 307 may be configured to:

receive, through the first connection, a file download request transmitted by the browser, the file download request carrying a download path of a to-be-downloaded file;

obtain the to-be-downloaded file according to the download path;

compress the to-be-downloaded file in the target container and download a compressed to-be-downloaded file from the target container through the second connection;

decompress the compressed to-be-downloaded file, to obtain the to-be-downloaded file; and transmit the to-be-downloaded file to the browser through the first connection.

The download path is a storage path of the to-be-downloaded file, so that the to-be-downloaded file can be found according to the download path.

The server may execute the tar command in the target container to compress the to-be-downloaded file, so that the server may decompress the to-be-downloaded file in a local memory of the server.

In the related technology, the file is not compressed when the file is downloaded from the container, and as a result, information errors and omissions are easily caused in a process of downloading the file, and quality of file transmission cannot be ensured. In an example embodiment, the server may compress the to-be-downloaded file in the target container and transmit the compressed to-be-downloaded file to the browser, to reduce bandwidth required for file transmission and improve efficiency of file downloading. In addition, after the server receives the compressed to-be-downloaded file, the server locally executes a decompression command and recovers the to-be-downloaded file, to prevent information error and omission in the process of downloading the file, so that the file downloaded by the user from the target container is recovered to the maximum extent, ensuring file transmission quality.

A series of operations of compressing the to-be-downloaded file, transmitting the to-be-downloaded file, decompressing the to-be-downloaded file, and the like that are performed after the server receives the file download request transmitted by the browser are automatically performed by the server, and the user does not need to manually input the command.

In the related technology, after the user logs in to the container, if the user needs to download a file from the container, the user needs to restart the container to download a file from the container. However, in an example embodiment, after logging in to the target container through the browser, the user does not need to restart the target container but may download the file from the container through the browser. Therefore, in an example embodiment, an operation for the user to download a file from the target container is also simplified, and efficiency of downloading a file from the target container is improved.

In some implementations, a speed of transmitting a file (that is, uploading a file or downloading a file) between the target container and the browser may also be controlled. For example, the container login apparatus 300 may further include a speed limiting unit 308. The speed limiting unit 308 may be configured to:

set a timing length of a timer and a limiting speed for file transmission; and control a file size of a transmitted file within each timing length according to the timing length and the limiting speed, the transmitted file including a file downloaded from the target container and/or a file uploaded to the target container.

The timing length is a time length set by a timer each time.

The limiting speed is a maximum speed for transmitting a file.

A file size of a file transmitted within each timing length may be calculated according to the timing length and the limiting speed. For example, the file size may be determined based on an equation, Bufsize=limiting speed (kbyte/s) x timing length (ms). Bufsize refers to a file size of a file transmitted within each timing length.

In an example implementation, the foregoing units may be implemented as independent entities, or may be randomly combined, or may be implemented as a same entity or several entities. For example implementation of the foregoing units, the foregoing method embodiments may be referred to. Details are not described herein again.

It may be known from the above descriptions that in an example embodiment, the first connection between the browser and the server is established, and the second connection is established between the server and the target container. Accordingly, the user can log in to the target container through a browser (web) interface. Also, an operation for the user to log in to the target container is simplified, and operation efficiency is improved.

Figure 5:
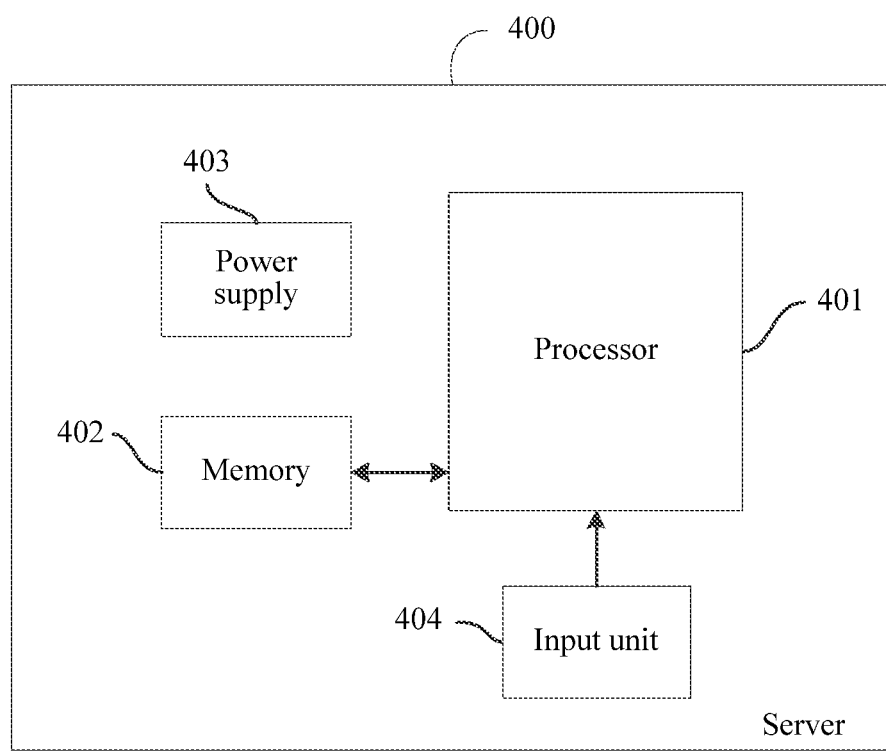
FIG. 5 is a schematic structural diagram of a server according to an example embodiment.

An example embodiment further provides a server. As shown in FIG. 5, FIG. 5 is a schematic structural diagram of a server according to an example embodiment.

The server may include components such as a processor 401 of one or more processing cores, a memory 402 of one or more computer readable storage media, a power supply 403, and an input unit 404. A person skilled in the art may understand that the server structure shown in FIG. 5 does not constitute a limit to the server. The server may include more or fewer parts than those shown in the figure, may combine some parts, or may have different part arrangements.

The processor 401 is a control center of the server, and is connected to various parts of the entire server by using various interfaces and lines. By running or executing a software program and/or module stored in the memory 402, and invoking data stored in the memory 402, the processor 401 executes various functions of the server and performs data processing, thereby monitoring the entire server. Optionally, the processor 401 may include one or more processing cores. Preferably, the processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program to perform at least one function (such as a sound playing function and an image display function), and the like. The data storage area may store data created according to use of the server, and the like. In addition, the memory 402 may include a high-speed random access memory, and may further include a non-volatile memory such as at least one magnetic disk storage device or a flash memory device, or another volatile solid storage device. The memory 402 may further include a memory controller, to provide access of the processor 401 to the memory 402.

The server further includes the power supply 403 that supplies power to each component. In an example embodiment, the power supply 403 may be logically connected to the processor 401 by using a power supply management system, so that functions such as management of charging, discharging, and power consumption are implemented by using the power supply management system. The power supply 403 may further include one or more of a direct current or alternating current power supply, a re-charging system, a power failure detection circuit, a power supply converter or inverter, a power supply state indicator, and any other component.

The server may further include the input unit 404. The input unit 404 may be configured to receive entered numeric or character information and generate keyboard, mouse, joystick, optical, or trackball signal input related to user settings and function control.

Although not shown in the figure, the server may further include a display unit, and the like. Details are not described herein again. Specifically, in an example embodiment, the processor 401 of the server may load, according to instructions, executable files corresponding to processes of one or more application programs into the memory 402. The processor 401 runs the application programs stored in the memory 402, to implement various functions including, but not limited to:

receiving a target container login request that is transmitted by a user (or from a user terminal) through a browser;

establishing a first connection between a server and the browser according to the target container login request;

obtaining a target container identifier of the target container through the first connection; and calling the connection control component of the container cluster management system and establish a second connection between the server and the target container through the connection control component and the identifier of the target container, to log in to the target container.

In some implementations, the processor 401 may further be configured to perform the following operations:

establishing a first sub-connection between the server and the connection control component;

calling the connection control component through the first sub-connection, so that the connection control component determines the target container according to the target container identifier and establishes a second sub-connection between the connection control component and the target container; and determining the first sub-connection and the second sub-connection as the second connection between the server and the target container.

In some implementations, the processor 401 may further be configured to perform the following operations:

establishing an https connection between the server and the browser according to the Hypertext Transfer Protocol and the target container login request; and converting the https connection into the first connection based on the WebSocket protocol.

In some implementations, the processor 401 may further be configured to perform the following operations:

receiving, through the first connection, a command that is transmitted by a user (or from a user terminal) through the browser;

transmitting the command to the target container through the second connection;

obtaining an execution result through the second connection, the execution result being a result that is obtained by running the command by the target container; and returning the execution result to the browser through the first connection.

In some implementations, the processor 401 may further be configured to perform the following operations:

receiving, through the first connection, a file upload request transmitted by the browser, the file upload request carrying a to-be-uploaded file;

compressing the to-be-uploaded file and upload a compressed to-be-uploaded file to the target container through the second connection; and decompressing the compressed to-be-uploaded file in the target container, so that the target container obtains the to-be-uploaded file.

In some implementations, the processor 401 may further be configured to perform the following operations:

receiving, through the first connection, a file download request transmitted by the browser, the file download request carrying a download path of a to-be-downloaded file;

obtaining the to-be-downloaded file according to the download path;

compressing the to-be-downloaded file in the target container and download a compressed to-be-downloaded file from the target container through the second connection;

decompressing the compressed to-be-downloaded file, to obtain the to-be-downloaded file; and transmitting the to-be-downloaded file to the browser through the first connection.

In some implementations, the processor 401 may further be configured to perform the following operations:

setting a timing length of a timer and a limiting speed for file transmission; and controlling a file size of a transmitted file within each timing length according to the timing length and the limiting speed, the transmitted file including a file downloaded from the target container and/or a file uploaded to the target container.

For example implementations of the foregoing operations, the foregoing embodiments may be referred to. Details are not described herein again.

It may be known from the above that in an example embodiment, the server establishes the first connection between the browser and the server and the second connection between the server and the target container. Accordingly, the user can log in to the target container through a browser (web) interface. Also, an operation for the user to log in to the target container is simplified, and operation efficiency is improved.

A person of ordinary skill in the art would understand that all or some of operations in various methods in the foregoing embodiments can be completed through instructions or completed through hardware related to instruction control. The instructions may be stored in a computer-readable storage medium and loaded and executed by the processor.

An example embodiment may provide a storage medium, storing a plurality of instructions, where the instructions can be loaded by the processor, to perform operations in any container login method provided in the example embodiments. For example, the instructions may be used to perform the following operations:

receiving a target container login request that is transmitted by a user through a browser; establishing a first connection between the server and the browser according to the target container login request; obtaining a target container identifier of the target container through the first connection; and calling the connection control component of the container cluster management system and establishing a second connection between the server and the target container through the connection control component and the identifier of the target container, to log in to the target container.

For example implementations of the foregoing operations, the foregoing embodiments may be referred to. Details are not described herein again.

The storage medium may include: a read-only memory (ROM), a random access memory (RAM), a magnetic disk, or an optical disc.

Because the instructions stored in the storage medium can be used to perform operations in any container login method provided in the embodiments, the instructions can implement beneficial effects achieved by any container login method provided in the embodiments. For details, the foregoing embodiments may be referred to. Details are not described herein again.

The container login method and apparatus, and the storage medium provided in the embodiments are described above in detail. Although the principles and implementations of the disclosure are described by using specific embodiments in the specification, the foregoing descriptions of the embodiments are only intended to help understand the method and core idea of the disclosure. A person of ordinary skill in the art may make modifications to the specific implementations and application range according to the idea. In conclusion, the content of the specification should not be construed as a limitation to the disclosure.

What is claimed is:

1. A method for logging in to a container, applied to a server, the method comprising:

displaying, on a browser, a browser interface to a user, the browser interface including (i) a name of a target container, (ii) an identifier of the target container, and (iii) an address of a control node corresponding to a container cluster in which the target container is located, wherein (i), (ii), and (iii) are associated with each other in the browser interface to be selected altogether by a selection control on the browser interface, the browser interface further including a control input to receive a target container login request from the user with respect to (i), (ii), (iii) that are selected by the selection control, wherein the target container login request is received via an operation on the control input of the browser interface without manually entering the address of the control node, and wherein a plurality of control nodes, respectively corresponding to container clusters, are managed by a container cluster management system, the container cluster management system being configured to perform container operations between the container clusters, each control node comprising two or more containers;

establishing a first connection between the server and the browser based on the target container login request received via the browser interface; and
establishing a second connection between the server and the target container based on the address of the control node and the identifier of the target container, to log in to the target container,
wherein the method further comprises:
receiving, through the first connection, a command from a user terminal through the browser;
transmitting the command to the target container through the second connection;
obtaining an execution result through the second connection, the execution result being based on the command transmitted to the target container; and
returning the execution result to the browser through the first connection,
wherein the method further comprises, with respect to the command being related to uploading or downloading a file to or from the target container:
setting a timing length, which is a time length set by a timer each time, and setting a limiting speed for file transmission, the limiting speed being a maximum speed for transmitting the file;
calculating a size of at least a portion of the file, to be downloaded from the target container to the browser or to be uploaded from the browser to the target container, during a duration of each timing length based on the set timing length and the set limiting speed; and
controlling file uploading or file downloading operation of the server with the browser, to transmit the at least the portion of the file having the calculated size during each timing length,
wherein the method further comprises:
receiving, through the first connection, a file upload request from the browser, the file upload request comprising a to-be-uploaded file;
compressing the to-be-uploaded file and uploading a compressed to-be-uploaded file to the target container through the second connection; and
decompressing the compressed to-be-uploaded file in the target container, and
wherein a series of operations of compressing the to-be-uploaded file, uploading the compressed to-be-uploaded file, and decompressing the compressed to-be-uploaded file are automatically performed by the server based on the server receiving the file upload request.

2. The method according to claim 1, wherein the establishing the first connection comprises:
establishing a Hypertext Transfer Protocol over Secure Socket Layer https connection between the server and the browser based on the Hypertext Transfer Protocol and the target container login request; and
converting the Hypertext Transfer Protocol over Secure Socket Layer https connection into the first connection based on a full-duplex communication protocol.

3. The method according to claim 1, further comprising:
receiving, through the first connection, a file download request from the browser, the file download request comprising a download path of a to-be-downloaded file;
obtaining the to-be-downloaded file based on the download path;
compressing the to-be-downloaded file in the target container and downloading a compressed to-be-downloaded file from the target container through the second connection;
decompressing the compressed to-be-downloaded file, to obtain the to-be-downloaded file; and
transmitting the to-be-downloaded file to the browser through the first connection.

4. A container login apparatus, applied to a server, comprising:
at least one memory operable to store program code; and
at least one processor operable to read the program code and operate as instructed by the program code, the program code comprising:
displaying code configured to cause at least one of the at least one processor to display, on a browser, a browser interface to a user, the browser interface including a name of a target container, an identifier of the target container, and an address of a control node corresponding to a container cluster in which the target container is located, wherein (i), (ii), and (iii) are associated with each other in the browser interface to be selected altogether by a selection control on the browser interface, the browser interface further including a control input to receive a target container login request from the user with respect to (i), (ii), (iii) that are selected by the selection control, wherein the target container login request is received via an operation on the control input of the browser interface without manually entering the address of the control node, and wherein a plurality of control nodes respectively corresponding to container clusters are managed by a container cluster management system, the container cluster management system being configured to perform container operations between the container clusters, each control node comprising two or more containers;
first establishment code configured to cause at least one of the at least one processor to establish a first connection between the server and the browser based on the target container login request received via the browser interface; and
second establishment code configured to cause at least one of the at least one processor to establish a second connection between the server and the target container based on the address of the control node and the identifier of the target container, to log in to the target container,
wherein the program code further comprises:
command receiving code configured to cause at least one of the at least one processor to receive, through the first connection, a command from a user terminal through the browser;
command transmitting code configured to cause at least one of the at least one processor to transmit the command to the target container through the second connection;
execution code configured to cause at least one of the at least one processor to obtain an execution result through the second connection, the execution result being based on the command transmitted to the target container; and
returning code configured to cause at least one of the at least one processor to return the execution result to the browser through the first connection,
wherein the program code further comprises, with respect to the command being related to uploading or downloading a file to or from the target container:
setting code configured to cause at least one of the at least one processor to set a timing length, which is a time length set by a timer each time, and set a limiting speed for file transmission, the limiting speed being a maximum speed for transmitting the file;

calculating code configured to cause at least one of the at least one processor to calculate a size of at least a portion of the file, to be downloaded from the target container to the browser or to be uploaded from the browser to the target container, during a duration of each timing length based on the set timing length and the set limiting speed; and controlling code configured to cause at least one of the at least one processor to control file uploading or file downloading operation of the server with the browser, to transmit at least the portion of the file having the calculated size during each timing length, wherein the program code further comprises:

code configured to cause at least one of the at least one processor to receive, through the first connection, a file upload request from the browser, the file upload request comprising a to-be-uploaded file;

code configured to cause at least one of the at least one processor to compress the to-be-uploaded file and upload a compressed to-be-uploaded file to the target container through the second connection; and code configured to cause at least one of the at least one processor to decompress the compressed to-be-uploaded file in the target container, and wherein a series of operations of compressing the to-be-uploaded file, uploading the compressed to-be-uploaded file, and decompressing the compressed to-be-uploaded file are automatically performed by the server based on the server receiving the file upload request.

5. The container login apparatus according to claim 4, wherein the first establishment code comprises:

code configured to cause at least one of the at least one processor to establish a Hypertext Transfer Protocol over Secure Socket Layer https connection between the server and the browser based on the Hypertext Transfer Protocol and the target container login request; and code configured to cause at least one of the at least one processor to convert the Hypertext Transfer Protocol over Secure Socket Layer https connection into the first connection based on a full-duplex communication protocol.

6. The container login apparatus according to claim 4, wherein the program code further comprises:

code configured to cause at least one of the at least one processor to receive, through the first connection, a file download request from the browser, the file download request comprising a download path of a to-be-downloaded file;

code configured to cause at least one of the at least one processor to obtain the to-be-downloaded file based on the download path;

code configured to cause at least one of the at least one processor to compress the to-be-downloaded file in the target container and download a compressed to-be-downloaded file from the target container through the second connection;

code configured to cause at least one of the at least one processor to decompress the compressed to-be-downloaded file, to obtain the to-be-downloaded file; and code configured to cause at least one of the at least one processor to transmit the to-be-downloaded file to the browser through the first connection.

7. The server to which the method according to claim 1 is applied, the server comprising at least one memory and at least one processor, the at least one memory storing a computer program executable by the at least one processor, to perform the method according to claim 1.

8. A non-transitory computer readable storage medium, storing instructions that are executable by at least one processor to perform a method for logging in to a container, the method comprising:

displaying, on a browser, a browser interface to a user, the browser interface including a name of a target container, an identifier of the target container, and an address of a control node corresponding to a container cluster in which the target container is located, wherein (i), (ii), and (iii) are associated with each other in the browser interface to be selected altogether by a selection control on the browser interface, the browser interface further including a control input to receive a target container login request from the user with respect to (i), (ii), (iii) that are selected by the selection control, wherein the target container login request is received via an operation on the control input of the browser interface without manually entering the address of the control node, and wherein a plurality of control nodes respectively corresponding to container clusters are managed by a container cluster management system, the container cluster management system being configured to perform container operations between the container clusters, each control node comprising two or more containers;

establishing a first connection between a server and the browser based on the target container login request received via the browser interface; and establishing a second connection between the server and the target container based on the address of the control node and the identifier of the target container, to log in to the target container, wherein the method further comprises:

receiving, through the first connection, a command from a user terminal through the browser;

transmitting the command to the target container through the second connection;

obtaining an execution result through the second connection, the execution result being based on the command transmitted to the target container; and returning the execution result to the browser through the first connection, wherein the method further comprises, with respect to the command being related to uploading or downloading a file to or from the target container:

setting a timing length, which is a time length set by a timer each time, and setting a limiting speed for file transmission, the limiting speed being a maximum speed for transmitting the file;

calculating a size of at least a portion of the file, to be downloaded from the target container to the browser or to be uploaded from the browser to the target container, during a duration of each timing length based on the set timing length and the set limiting speed; and controlling file uploading or file downloading operation of the server with the browser, to transmit at least the portion of the file having the calculated size during each timing length, and wherein the method further comprises:

receiving, through the first connection, a file upload request from the browser, the file upload request comprising a to-be-uploaded file;

compressing the to-be-uploaded file and uploading a compressed to-be-uploaded file to the target container through the second connection; and decompressing the compressed to-be-uploaded file in the target container, and wherein a series of operations of compressing the to-be-uploaded file, uploading the compressed to-be-uploaded file, and decompressing the compressed to-be-uploaded file are automatically performed by the server based on the server receiving the file upload request.

9. The non-transitory computer readable storage medium according to claim 8, wherein the instructions are executable by the at least one processor to establish the first connection by performing:

establishing a Hypertext Transfer Protocol over Secure Socket Layer https connection between the server and the browser based on the Hypertext Transfer Protocol and the target container login request; and converting the Hypertext Transfer Protocol over Secure Socket Layer https connection into the first connection based on a full-duplex communication protocol.

10. The method according to claim 1, wherein the establishing the second connection comprises:

calling a connection control component of the container cluster management system and establishing a first sub-connection between the server and the connection control component; and calling the connection control component through the first sub-connection, upon which the connection control component is connected to the control node based on the address of the control node, and establishing a second sub-connection between the connection control component and the target container based on the identifier of the container cluster and the identifier of the target container.

11. The container login apparatus according to claim 4, wherein the second establishment code comprises:

code configured to cause at least one of the at least one processor to call a connection control component of the container cluster management system and establish a first sub-connection between the server and the connection control component; and code configured to cause at least one of the at least one processor to call the connection control component through the first sub-connection, upon which the connection control component is connected to the control node based on the address of the control node, and establish a second sub-connection between the connection control component and the target container based on the identifier of the container cluster and the identifier of the target container.

12. The non-transitory computer readable storage medium according to claim 8, wherein the instructions are executable by the at least one processor to establish the second connection by performing:

calling a connection control component of the container cluster management system and establishing a first sub-connection between the server and the connection control component; and calling the connection control component through the first sub-connection, upon which the connection control component is connected to the control node based on the address of the control node, and establishing a second sub-connection between the connection control component and the target container based on the identifier of the container cluster and the identifier of the target container.

\* \* \* \* \*